United States Patent [19]

Shimojo et al.

[11] Patent Number: 5,787,072
[45] Date of Patent: Jul. 28, 1998

[54] FLOW CONTROL APPARATUS AND FLOW CONTROL METHOD

[75] Inventors: Yoshimitsu Shimojo; Yasuro Shobatake, both of Kanagawa-ken, Japan

[73] Assignee: Kabushiki Kaisha Toshiba, Kawasaki, Japan

[21] Appl. No.: 616,311

[22] Filed: Mar. 15, 1996

[30] Foreign Application Priority Data

Mar. 23, 1995 [JP] Japan ................... 7-063256

[51] Int. Cl.$^6$ ............................................. H04L 12/56
[52] U.S. Cl. .................. 370/231; 370/235; 370/236; 370/253; 370/396
[58] Field of Search ..................... 370/229, 230, 370/231, 235, 236, 252, 253, 355, 389, 395, 396, 400, 401, 428, 429; 395/200.13, 849

[56] References Cited

U.S. PATENT DOCUMENTS

| | | | |
|---|---|---|---|
| 5,014,265 | 5/1991 | Hahne et al. | 370/397 |
| 5,179,556 | 1/1993 | Turner | 370/233 |
| 5,313,454 | 5/1994 | Bustini et al. | 370/231 |
| 5,457,687 | 10/1995 | Newman | 370/236 |
| 5,493,566 | 2/1996 | Ljungberg et al. | 370/231 |

FOREIGN PATENT DOCUMENTS 6-197122  7/1994  Japan.

OTHER PUBLICATIONS

Infocom 94 (IEEE), "On Closed-Loop Rate Control For ATM Cell Relay Networks;" Nanying Yin and Michael G. Hluchy; 1994.

Primary Examiner—Alpus H. Hsu
Attorney, Agent, or Firm—Oblon, Spivak, McClelland, Maier & Neustadt, P.C.

[57] ABSTRACT

A flow control apparatus is connected to an ATM switch having a plurality of input ports and a plurality of output ports provided among ATM exchanges through transmission links. A buffer is connected to the input port and temporarily stores ATM cells output from the ATM switch, wherein the ATM cells are transmitted through the ATM switch to the output port connected to a next ATM exchange. A controller sets up the ATM switch wherein first-free information cells conveying the free-buffer information of the buffer input to the input port are transmitted to the output port connected to a preceding ATM exchange. The controller also controls transmission of the ATM cells from the buffer based on second free-buffer information cells transmitted from the next ATM exchange and traffic parameters for guaranteeing transmission quality.

15 Claims, 23 Drawing Sheets

FLOW CONTROL APPARATUS AND FLOW CONTROL METHOD

BACKGROUND OF THE INVENTION

1. Field of the Invention

The present invention relates to a flow control apparatus and flow control method at cell switch nodes that do not have a flow control function, in particular preventing loss of cells due to congestion in an ATM exchange network.

2. Description of the Related Art

ATM (asynchronous transfer mode) communication systems are currently being studied by researchers in communication technology throughout the world. In the ATM communication system, information is transferred and exchanged by means of packets of fixed length, called cells. With the ATM communication system, high speed cell switching can be achieved by means of a cell switch using hardware, making it possible to implement a communication network whose information transfer capability per unit time exceeds that of existing communication networks.

As a mode of installation of switch nodes for the exchange of ATM cells, a typical layout that may be considered is the bookshelf type of installation as shown in FIG. 1. This layout consists essentially of three elements: a switch circuit board 10, interface circuit boards 12, and a back plane 14. The interface circuit 12 boards have interface points 16, and a transmission circuit 18 and receiver circuit 20 matching the specification of the physical transmission link. By changing the type of interface circuit board, physical transmission links of different specifications can easily be accommodated at a switch node. Cells that arrive from one of the interface points 16 and are input to the receiver circuit 20 of the interface circuit board 12 have a routing tag appended to them and are sent to the switch circuit board 10 through the back plane 14. Switching is performed on the swith circuit board 10, such as by means of a hardware switch 22, under the control of the routing tag; after this, the cells are transferred to the appropriate interface circuit board 12, passing once more through the back plane 14, and the routing tag is removed before the cells are output to the interface point.

In the ATM communication system, a plurality of connections can be set up logically on a single physical transmission path, by means of identification information, called VPI (virtual path identifier) and VCI (virtual channel identifier) of the cell header. The physical transmission link can be effectively utilized, due to the statistical multiplexing effect of the cells, and it is believed that a connection set up guaranteeing quality can be achieved. What is meant by quality in this regard is cell loss rate and/or cell transmission delay time, etc.

In the case of a cell transmission path that is closed in the interior of a single switch node, apart from the method wherein a VPI and VCI of a cell header are utilized for the connection identifier, another method of identification is possible wherein, together with the routing tag etc. an additional local connection identifier is attached to the cell. By lookup from a table of VPI and VCI information, the local connection identifier is appended to a cell by the receiving circuit of the interface circuit board within the switch node, together with the routing tag; after switching is performed, it is then removed by the transmission circuit of the interface circuit board. The VPI and VCI are uniquely allocated in the physical transmission path between switch nodes, so the switch node has the capability of rewriting the values of VPI and VCI of the cells passing through it. The local connection identifier can be used for looking up a table of new VPI and VCI information.

Hitherto, connections guaranteeing quality in an ATM network have been based on CBR (constant bit rate) connections or VBR (variable bit rate) connections. A CBR connection is a form of connection whereby traffic is transmitted having a cell transmission rate (also called cell rate or bandwidth, i.e., number of cells transmitted per unit time) is fixed. A VBR connection is a form of connection in which the cell transmission rate is not fixed. However, the nature of the traffic, such as its maximum value (peak rate) and average value (average rate) is fixed.

Basically, when multiplexing a plurality of connections on to a single physical transmission link while maintaining good quality, the sum of the peak rates of all the connections should be no more than the bandwidth of the physical transmission link. This technique is called "peak rate allocation". If only CBR connections are subjected to peak rate allocation, a sufficiently high degree of efficiency of utilization of the physical transmission link can be achieved. In the case of VBR connections, a high efficiency of utilization of the physical transmission link cannot be achieved by peak rate allocation. With VBR connections, the utilization rate of the physical transmission link with peak rate allocation cannot be high. It is therefore desirable to develop techniques for increasing the rate of utilization while maintaining quality, using a statistical multiplexing effect, from the nature of the traffic.

However, if communications between computers are considered, this can have a nature wherein the nature of the traffic, in particular its average rate, cannot likely be predicted beforehand and/or a bursty character, in which a large amount of cells are transmitted instantaneously, but, it also has frequent idle periods, where no cells at all are being transmitted. It is therefore difficult to increase the efficiency of utilization of a network while guaranteeing quality as in CBR and/or VBR. That is, with data that is transmitted between computers, there are the problems that the efficiency of utilization of the network is severely compromised when the attempt is made to ensure quality by peak rate allocation etc, and, if the statistical multiplexing effect is employed as in VBR, due to the bursty nature of the traffic, a large quantity of cells may arrive simultaneously at a particular output port of a switch node, resulting in buffer overflow, causing cell loss.

Accordingly, in recent years, various mechanisms have been proposed to increase the efficiency of network utilization by applying flow control between terminal and switch node and between switch node and switch node to ensure quality of the transmitted data between computers (in particular quality in respect of cell loss). With an apparatus (switch node and/or destination terminal) having a flow control function on the receiving side, when there would a risk that cells will overflow from the buffer and would be lost, transmission of cells to the apparatus (switch node and/or source terminal) having a flow control function on the transmission side be suspended. In such systems, a special layout must be provided for a flow control function at the switch nodes.

To add this function to a conventional switch node wherein a flow control function was not envisaged is difficult due to the fact that the switching function of the switch node is performed by hardware. Since a fundamental structural alteration of both the switch circuit board and the interface circuit board was required, in order to add a flow control function to a switch node during operation.

Furthermore, when new flow control systems of good performance and new flow control systems providing further novel services will be proposed; it will be necessary to add flow control functions to such systems, and operation of the switch node will be interrupted. Even when only a small degree of function alteration/addition will be required, interface circuit boards or switch circuit boards must be changed during service. There is the risk that all the connections including CBR and/or VBR not requiring a flow control function that were set up therein would have to be disconnected.

A further problem is that, in a switch node that accommodates a large number of interface points, there is the possibility that various flow control will be required by the interface point and/or the possibility that there may be some interface points that do not require a flow control function. If one attempts to provide for all the flow control mechanisms required to cope with all of these constraints, the cost of the switch node would be greatly increased.

In this context, in order to set up a connection equipped with flow control to a switch node not having a flow control function, a technique called rate-based and a technique called tunnelling have been proposed.

In the case of rate-based control, a function is necessary of adding congestion experience information to a switch node that does not have a control function. The volume of the hardware required to implement this function is in general smaller than the volume of the hardware required to implement a flow control function. A typical method is as follows. When congestion occurs, congestion experience information is added to cells that have experienced congestion. The header of an ATM cell is provided with a region displaying whether or not it experiences congestion. Control is effected such that apparatus having a downstream flow control function that have received cells displaying "congestion experienced", restrict flow relative to the output rate of apparatus having a flow control function upstream of a switch node in which congestion is being experienced.

In contrast, the tunnelling is a technique whereby, when the connection with flow control passes through a switch node that does not have a flow control function, an apparatus having a flow control function upstream thereof guarantees the quality by changing the traffic (e.g. traffic of restricted peak rate, etc).

The following problems are common to both the technique using rate-based control and the tunnelling.

When there are a large number of switch nodes not having a flow control function between the apparatuses having a flow control function on a connection with flow control, or when the cell transmission delay becomes large, irrespective of whether rate-based control or tunnelling is adopted, when the cell buffer of an apparatus having a downstream flow control function is approaching overflow, the apparatus having the downstream flow control function will transmit control information to an upstream apparatus for the purpose of regulating transmission of cells; however, when the cell transmission delay time is large, a large number of cells may be transmitted on to the transmission path during the period where the control information is traversing to the upstream apparatus having the flow control function from the apparatus where congestion occurred. It is therefore necessary for the apparatus that caused the congestion to have a sufficiently large buffer such that these cells are not lost. If the buffer is too small, flow control information must be transmitted such as to suppress cell transmission beforehand; this has the drawback of producing lower throughput.

Also, if solely the tunnelling technique is considered, this has the following drawbacks, explained with reference to FIG. 2. For example, when traffic whose three peak rates C1,C2 and C3 are controlled and which is output from an apparatus having a flow control function is respectively input at three input ports of a switch node 24 not having a flow control function, and is changed over, so that it is output to one particular output port, a bandwidth consisting of the sum of C1, C2 and C3 is required at the output port in order to guarantee quality. However, when the flow-controlled connections are mainly for transfer of data between computers, it is not necessarily true that cells are transmitted with the bandwidth of the sum being always effectively utilized. In such a case, it can happen that this bandwidth is unused for most of the time, notwithstanding that other connections cannot be used. Thus it would not be possible to employ the network resources efficiently.

As described above, when transferred data between computers is handled by means of an ATM network, the switch nodes must be given a flow control function, but there is the problem that it is difficult to add this function in a flexible manner. Also, regarding the conventional countermeasures in cases where the switch nodes do not have a flow control function, there is the problem that these could lead to impaired performance and do not enable the network resource to be utilized in an efficient manner.

SUMMARY OF THE INVENTION

It is an object of the present invention to provide a flow control appratus and flow control method whereby a flow control function can be added easily, and even during operation, to switch nodes not having a flow control function.

According to the present invention, there is provided flow control apparatus connected to an ATM switch having a plurality of input ports and a plurality of output ports coupled among ATM exchanges through transmission links, comprising: a flow control element including buffer means for temporarily storing ATM cells output from said ATM switch, connected to one of the input ports so that said ATM cells are transmitted through said ATM switch to the output ports connected to a next ATM exchange; and control means for providing a first control cell conveying free-buffer information of said buffer means for inputting to one of the input ports for transmission from one of the output ports connected to a preceding ATM exchange, and for controlling transmission of said ATM cells from said buffer means based on second control cells received from said next ATM exchange and traffic parameters for guaranteeing transmission quality.

Further in accordance with the present invention, there is provided a method for performing flow control of an ATM exchange, having an ATM switch including a plurality of input ports and a plurality of output ports, coupled among ATM exchanges through transmission links, and a buffer for temporarily storing ATM cells output from said ATM switch, the buffer coupled to the input port, wherein said ATM cells are transmitted through said ATM switch to the output port connected to a next ATM exchange, comprising the steps of: setting up said ATM switch so that first control cells conveying free-buffer information of said buffer input to the input port are transmitted to the output port connected to a preceding ATM exchange; and controlling transmission of said ATM cells from said buffer menas based on second control cells transmitted from and conveying free-buffer information of said next ATM exchange and, based on traffic parameters for guaranteeing transmission quality.

DETAILED DESCRIPTION OF THE PREFERRED EMBODIMENTS

Embodiments of the present invention are described below with reference to the drawings.

Figure 1:
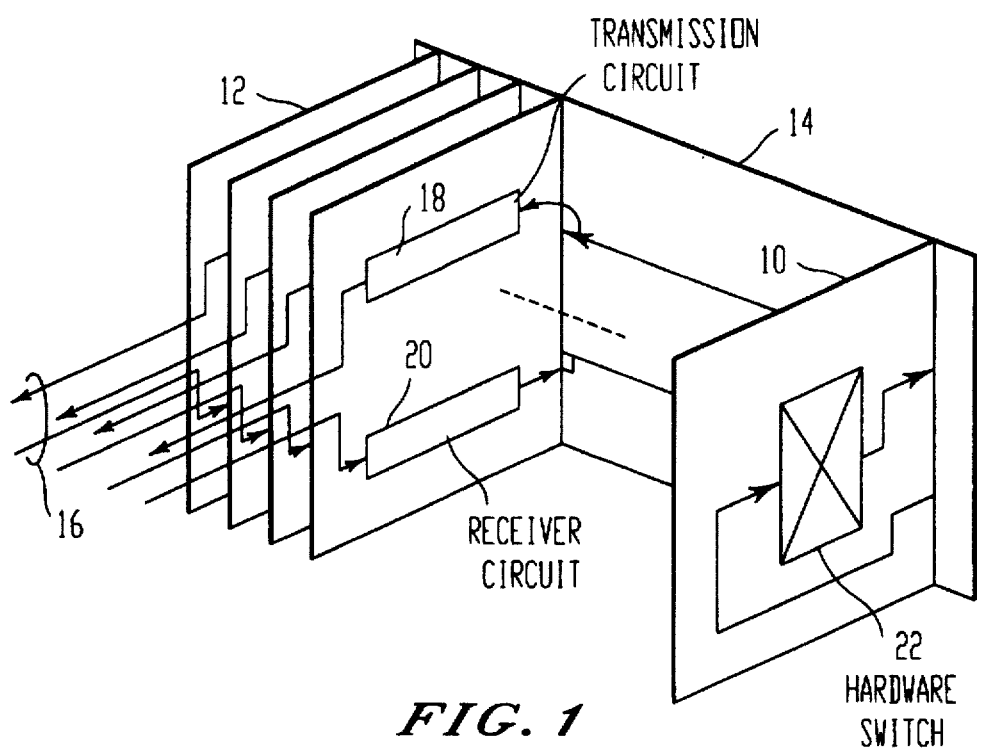
FIG. 1 is the physical layout of a switch node of the prior art.
Figure 2:
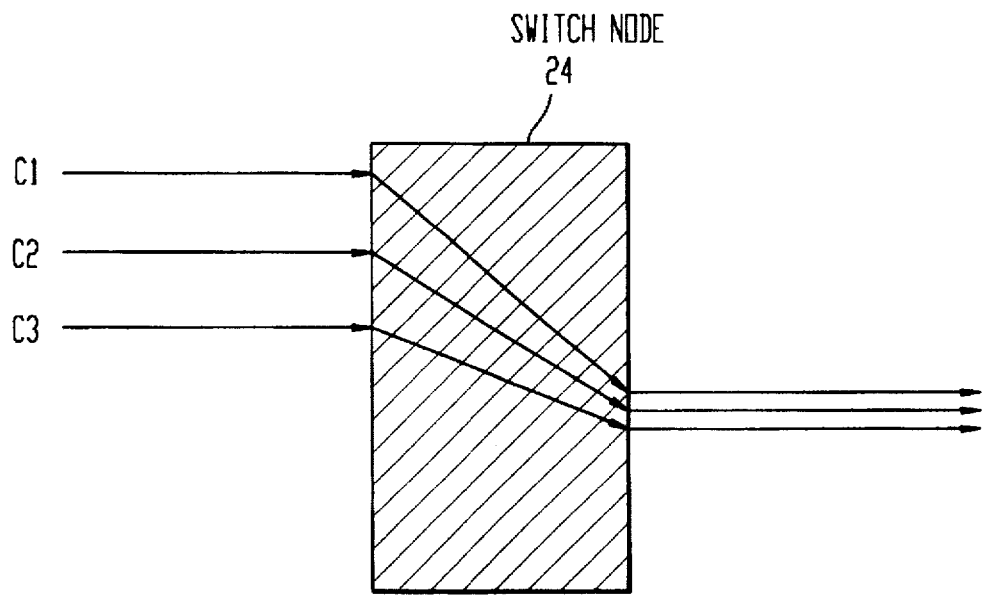
FIG. 2 is a schematic diagram of a conventional tunnelling technique.
Figure 3:
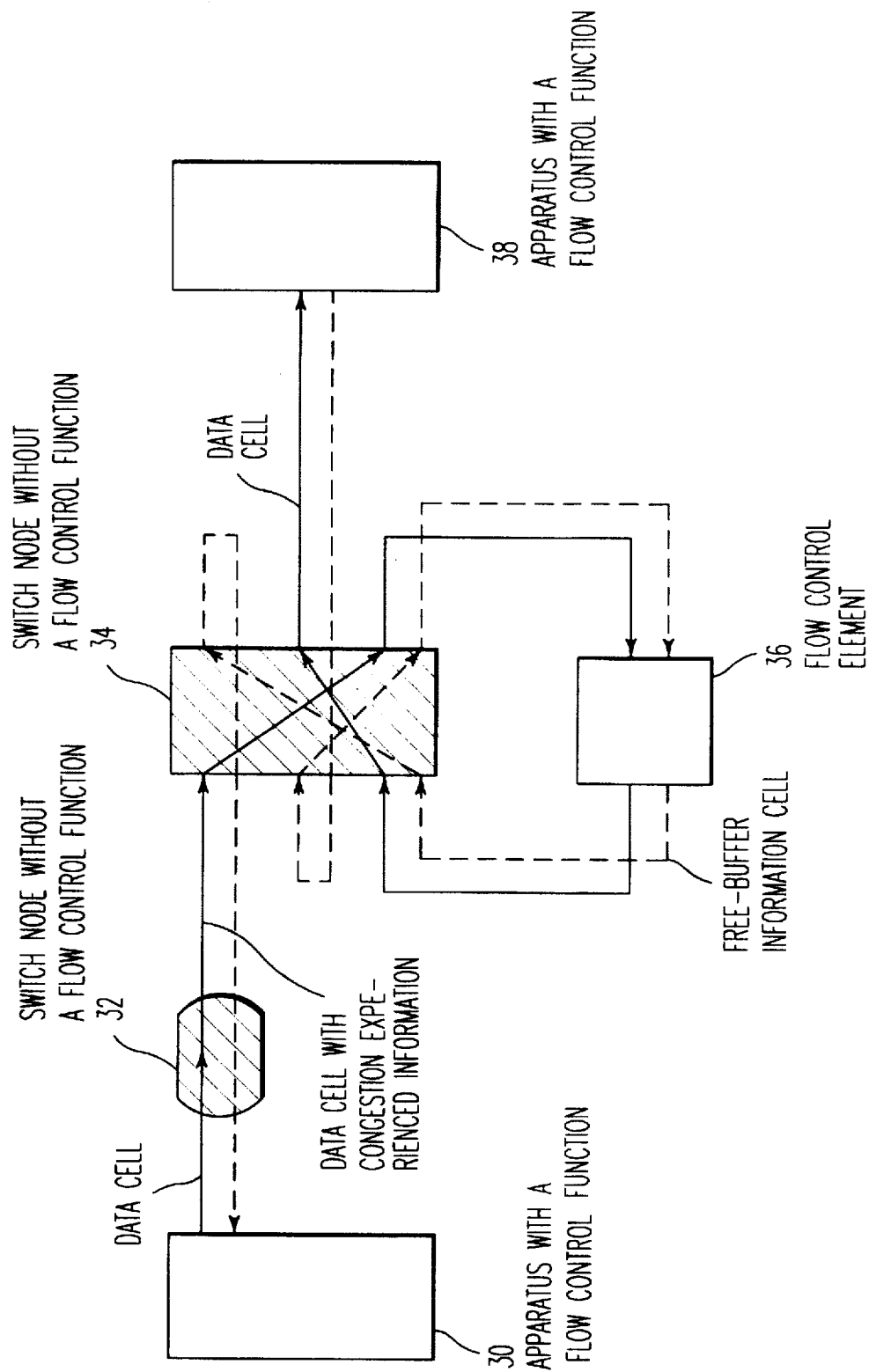
FIG. 3 shows the flow of cells through a flow control apparatus constructed according to the present invention.

First, an overview of the operation of flow control apparatus according to the invention will be provided. The flow control apparatus of the present invention acts effectively with a switch node not having a flow control function. FIG. 3 is a diagram illustrating the flow of flow control information in an ATM network equipped with the flow control apparatus constructed according to the present invention.

Data cells belonging to a flow controlled connection, from an apparatus 30 with a flow control function (shown on the left in FIG. 3) that is upstream of the flow control apparatus of the present invention, pass through one or more switch nodes 32,34 without a flow control function, and arrive at a flow control element or apparatus 36 constructed according to the present invention. Also, cells for transmitting free-buffer information are transmitted to the apparatus 30 from the flow control apparatus 36. The free-buffer information cells are used for flow control.

When a data cell passes through the switch node 32 that does not have a flow control function, congestion-experienced information may be appended to this data cell by the switch node. This "congestion-experienced" information indicates to the flow control apparatus 36 that congestion has occurred upstream. The content of this congestion-experienced information is carried by the free-buffer information cell that is transmitted upstream.

When the apparatus 30 receives the free-buffer information cell, it is able to use the flow control information and/or congestion-experienced information contained in this cell to control transmission of data cells in such a way that these cells are not lost.

Flow control is performed as above such that cell loss does not occur between the flow control apparatus 36 and the apparatus 30.

In the same way, flow control is also performed between the flow control apparatus 36 and an apparatus 38 (shown on the right in FIG. 3) having a flow control function that is downstream and is connected through one or more switch nodes without a flow control function.

The flow control apparatus 36 has a traffic parameter for guaranteeing quality such that data cells are not lost in the non flow controlling apparatus that are downstream. The traffic parameter for quality guaranteeing is preset corresponding to each of the downstream apparatuses having a flow control function.

The flow control apparatus of the present invention controls the data transmission cells using the flow control information and/or congestion-experienced information contained in a buffer-free information transmission cell that is transferred to it from an apparatus having a flow control function located downstream, and the traffic parameters for quality guarantee purposes.

Transmission can be achieved without cell loss by performing flow control on all paths from the source terminal via several apparatuses having a flow control function, to the destination terminal.

Flow control methods of the apparatus as referred above is described next. There are some methods of regulating the cell stream such that overflow of the buffer in the interior of the flow control apparatus does not occur. A first of them is called the "credit method". In this method, a downstream apparatus with a flow control function transmits the amount of free buffer area (credit) within the downstream apparatus to an upstream apparatus and the upstream apparatus transmits cells to the downstream apparatus such that the number of cells does not exceed the amount of free buffer area. A free-buffer information cell carrying the information, for example, "N cells have been output from the buffer of connection X, so the capability exists to store N further cells in the buffer of the connection X" is received from the downstream apparatus having a flow control function. As long as no more than the number of data transmission cells for which permission has been given from downstream are transferred, there will be no loss of cells from the buffer of the downstream apparatus having a flow control function.

When the flow control apparatus of the present invention performs the flow control of the credit-method, there will be a delay time while the buffer-free information transmission cell is transmitted from downstream to upstream; the downstream flow control apparatus must therefore have a buffer provided with some margin. Also, in order to prevent loss of the credit information between upstream and downstream caused by bit errors, it is necessary to have a mechanism for periodically synchronizing the credit information. For this loss prevention mechanism, the flow control apparatus of the present invention may be equipped with conventional mechanisms used as the credit information synchronization mechanism.

The second method is called a rate-based control. In this method, a function of notifying the congestion of the flow controlling switch node to an upstream apparatus with a flow control function, directily or indirectly, is needed at a switch node not having a flow control function.

For example, a switch node may be equipped with the function of appending congestion-experienced information to cells that have experienced congestion. A downstream apparatus with a flow control function that has received such cells that experienced congestion transfers a free-buffer information cell to an upstream apparatus with a flow control function; this free-buffer information cell is created to reflect the content of this indication.

Furthermore, the apparatus having a flow control function transfers a free-buffer information cell in the same direction as the data cell, at an interval determined in accordance with an algorithm (e.g. at fixed time intervals, or every time a fixed number of data cells has been transferred), for example. The downstream apparatus having a flow control function loops this control cell back upstream. (The control cell that has been looped back will also be referred to as a free-buffer information cell). The switch node through which the control cell or free-buffer information cell passes writes into this cell, depending on the state of congestion, information to the effect that "it is congestion (or: it is not congestion)". When this control method is performed, the flow control apparatus of the present invention writes, to the cell that is looped back, information reflecting the condition of its internal buffer. The flow control apparatus of the present invention that practices this method must have a function of transferring a data cell and control cell in the direction of a downstream apparatus with a flow control function, in order to effect flow control between itself and the downstream apparatus with a flow control function.

Once it has received the free-buffer information cell, the upstream flow control apparatus of the present invention uses it to control cell streams. The control that it performs is that, if there is congestion, it decreases the rate of the data cells, while if there is no congestion, it increases the rate of the data cells.

When the flow control apparatus of the present invention operates in accordance with the rate-based control, it is necessary that EFCI(explicit forward congestion notification) bit of cells should not be transferred downstream by switch nodes that do not have a flow control function and which are further upstream. This is to avoid apparatus with a flow control function which are downstream of the flow control apparatus of the present invention being mistakenly judged to be in a congested condition due to irrelevant EFCI bit of cells.

A further type of rate control method may be practiced. In the rate control method described above, in which an apparatus having a flow control function transfers a control cell in the same direction as the data transmission cells, when a control cell or free-buffer information cell passes each switch node, the switch node has the function of writing into this cell information: "make the cell transmission rate this rate".

After a flow control apparatus according to the present invention has received a free-buffer information cell, it calculates a new cell transmission rate using this. Thus, various methods of flow control under the ATM communication system are possible and the flow control apparatus according to the present invention acts in an effective manner irrespective of the method of flow control.

Five embodiments of constructions of flow control apparatus according to the present invention are described next.

Figure 4:
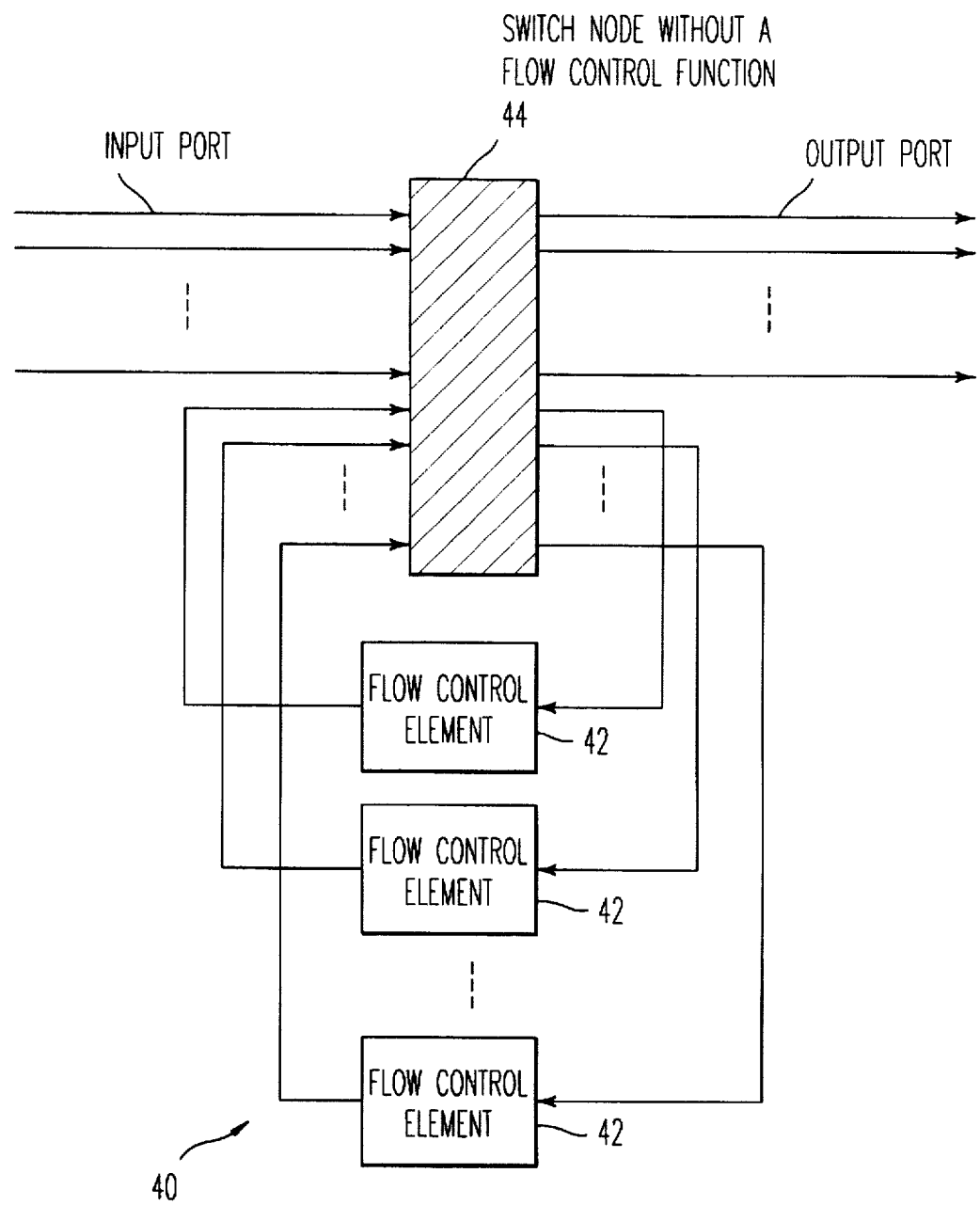
FIG. 4 shows the connection of a flow control apparatus according to a first embodiment of the present invention.

As a first embodiment of the present invention, FIG. 4 shows a flow control apparatus 40 including one or more flow control elements or apparatuses 42 according to the present invention being coupled to a switch node 44 not having a flow control function. The manner of this connection is that an output port of the switch node 44 is connected to a cell input of each flow control apparatus 42 and a cell output of each flow control apparatus 42 is connected to the input port of the switch node 44.

Figure 5:
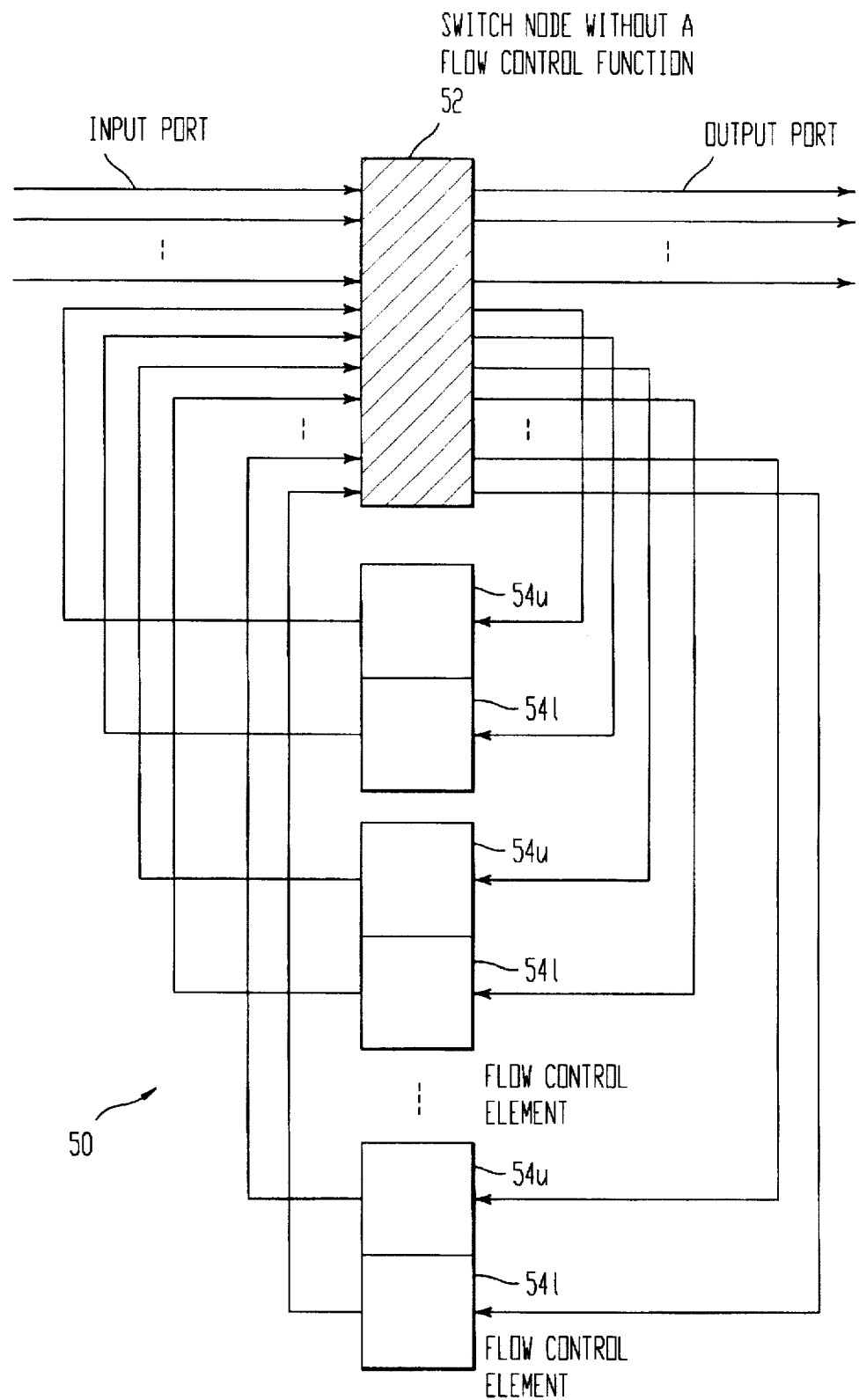
FIG. 5 shows connection of a flow control apparatus according to a second embodiment of the present invention.

FIG. 5 shows a flow control apparatus 50 of a second embodiment of the present invention coupled to a switch node 52 that does not have a flow control function. One or more flow control elements or apparatuses 54u,54l according to the present invention are connected to the switch node not having a flow control function. Just as in the case of the first embodiment the manner of the connection is that an output port of the switch node 52 is connected to the cell input of each flow control apparatus 54u,54l and the cell output of each flow control apparatus 54 is connected to the input port of the switch node 52.

Figure 6:
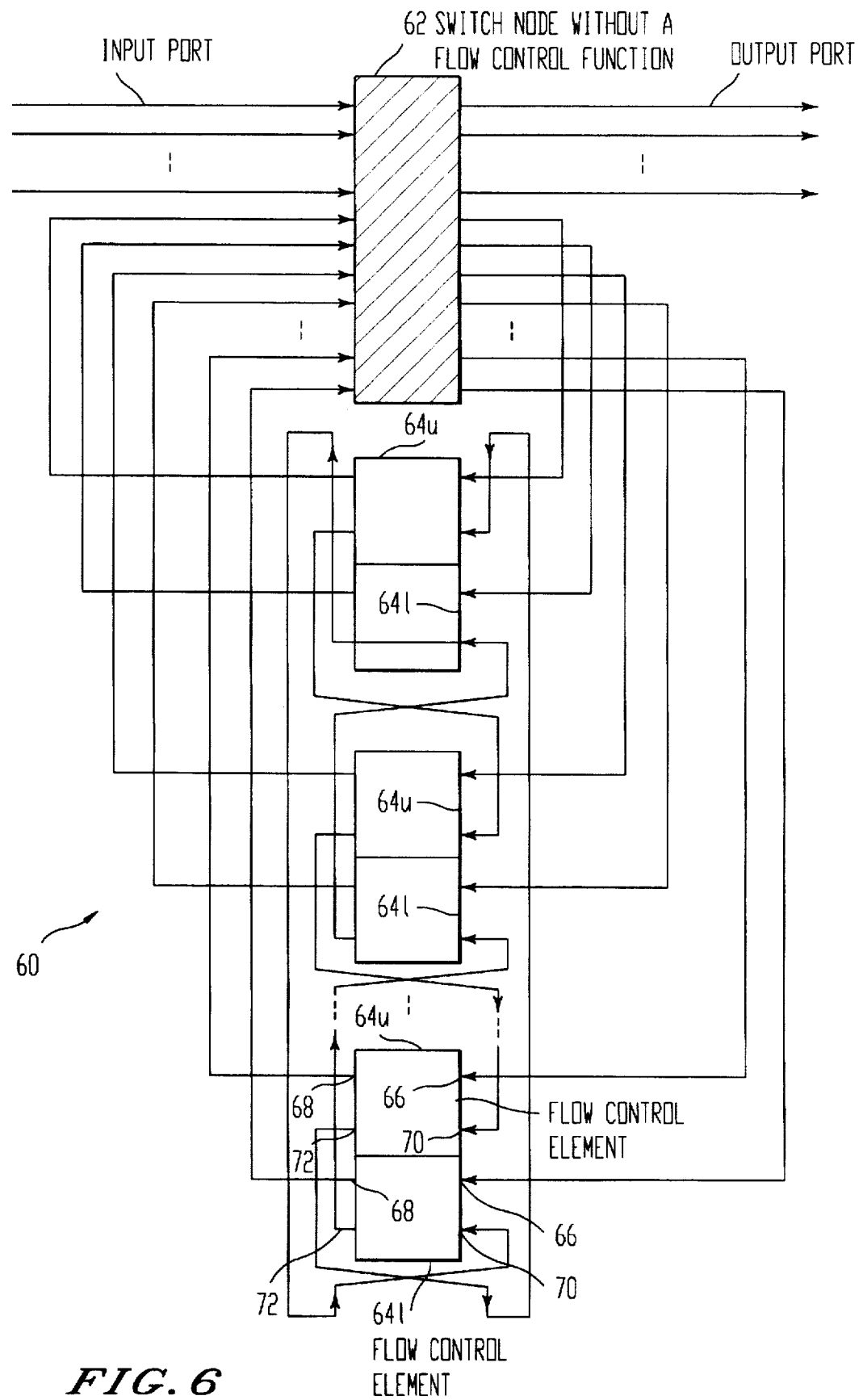
FIG. 6 shows the connection of a flow control apparatus according to a third embodiment of the present invention.

FIG. 6 shows a flow control apparatus 60 of a third embodiment of the present invention, coupled to a switch node 62 not having a flow control function. One or more flow control elements or apparatuses 64u,64l according to the present invention are connected to the switch node 62. Each flow control apparatus 64u,64l according to the present invention, in addition to a cell input 66 and cell output 68, has an auxiliary cell input 70 and an auxiliary cell output 72. The manner of the connection is that the output port of the switch node 62 and the cell input 66 of the flow control apparatus 64u are connected, and the cell output 68 of the flow control apparatus 64u and input port of the switch node 62 are connected; apart from this, the auxiliary cell output 72 of the flow control apparatus 64u is mutually connected to the auxiliary cell input 70 of another one of the flow control apparatuses 64u, as shown in FIG. 6.

Figure 7:
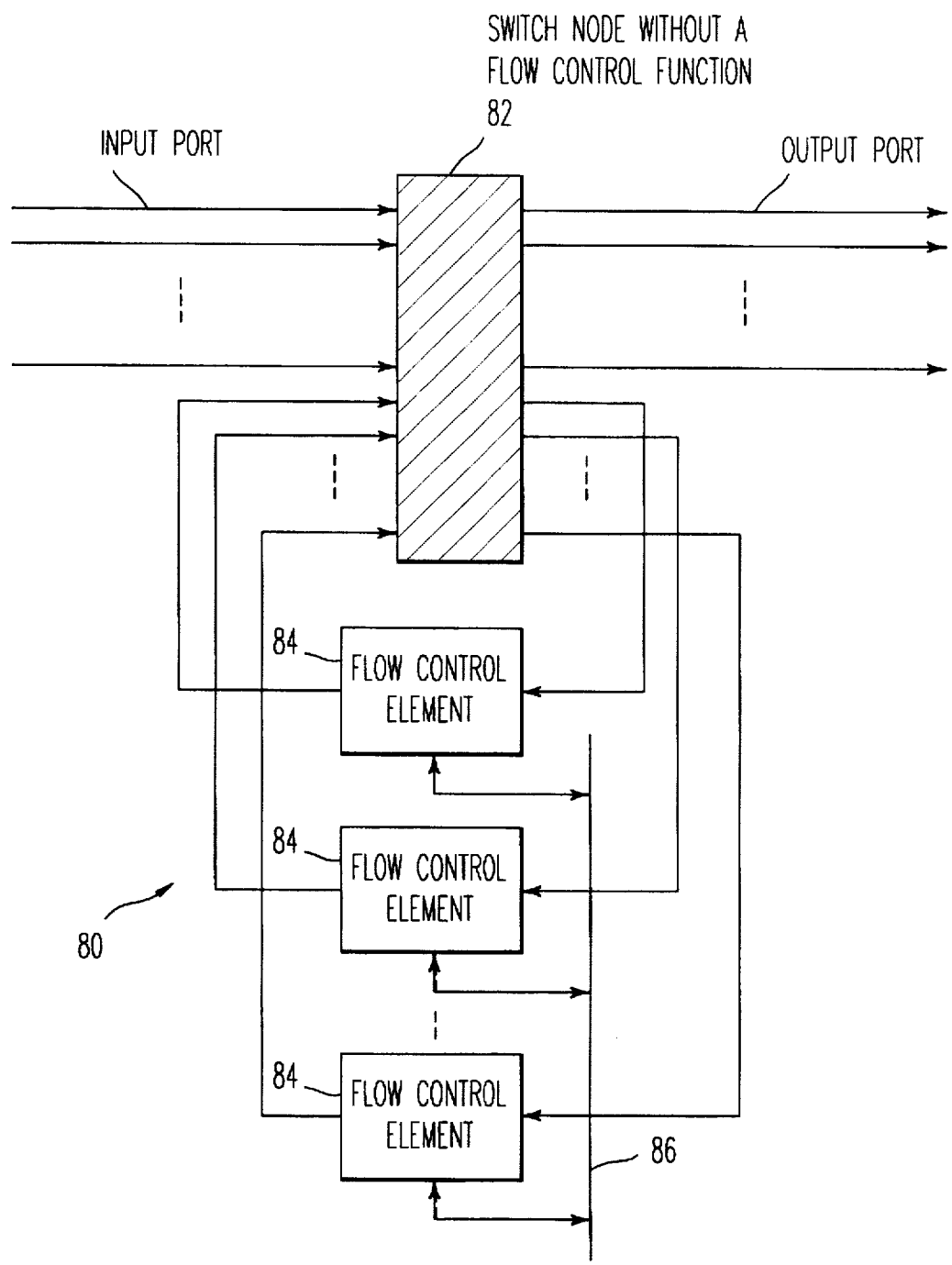
FIG. 7 shows connection of a flow control apparatus according to a fourth embodiment of the present invention.

FIG. 7 shows flow control apparatus 80 of a fourth embodiment of the present invention, coupled to a switch node 82 not having a flow control function. One or more flow control elements or apparatuses 84 according to the present invention are connected to the switch node 82. The manner of the connection is the same as in the case of the first embodiment. The point of difference with respect to the first embodiment is that mutual connection is effected through an interface 86 between the flow control apparatus 84.

Figure 8:
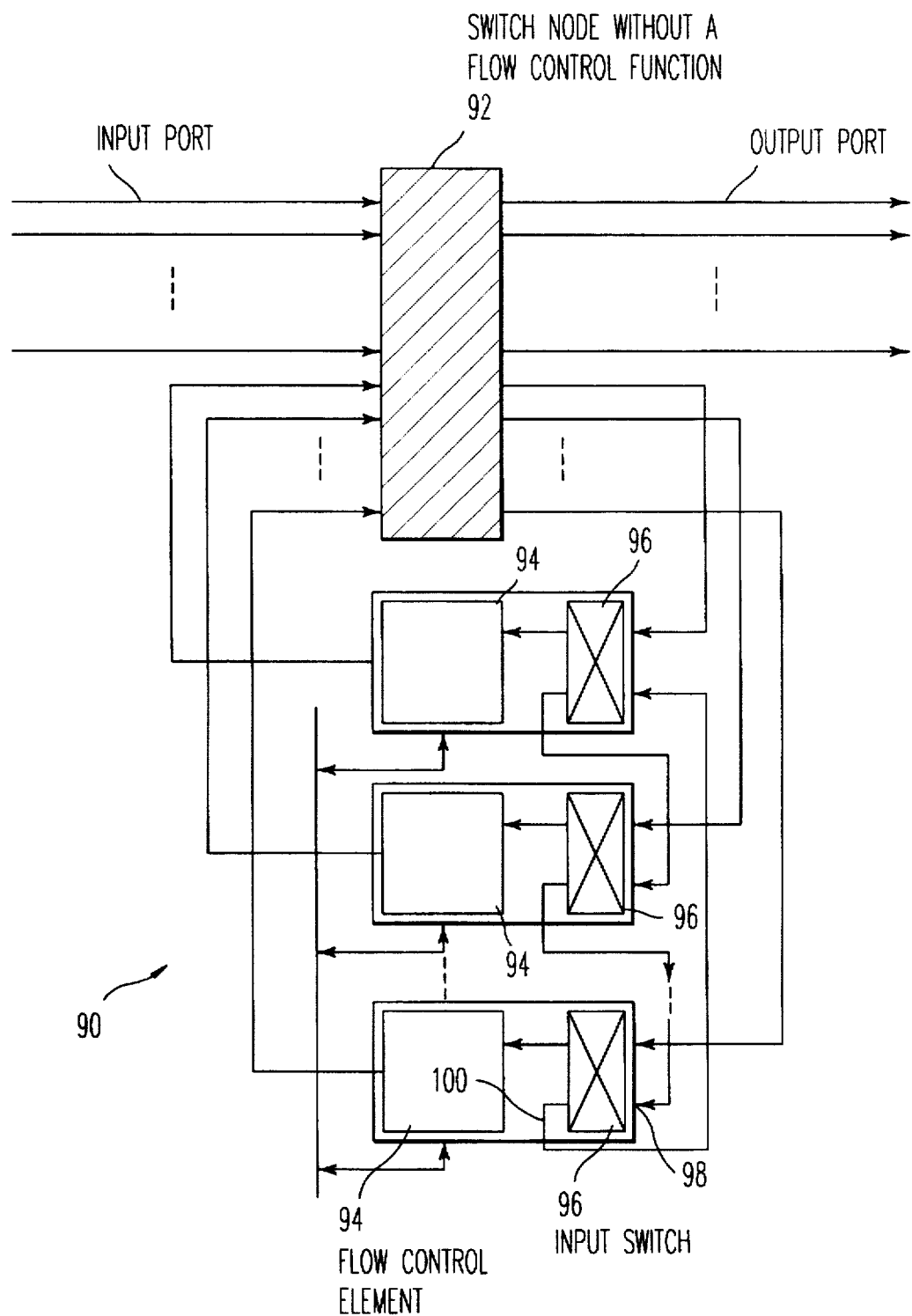
FIG. 8 shows connection of a flow control apparatus according to a fifth embodiment of the present invention.

FIG. 8 shows a flow control apparatus 90 of a fifth embodiment of the present invention, coupled to a switch node 92 not having a flow control function. One or more flow control elements or apparatuses 94 according to the present invention are connected to the switch node 92. The manner of the connection is the same as in the case of the fourth embodiment. The point of difference from the fourth embodiment is that a flow control apparatus input switch 96 is provided on the input side of the flow control apparatus 94. This flow control apparatus input switch 96 has an auxiliary cell input 98 and auxiliary cell output 100; the construction is such that the flow control apparatus 94 is connected through the expansion cell input 98 and output 100.

Specific examples of the functional layouts of each of the first-fifth embodiments will now be described.

First, the flow of cells in each construction will be described.

Figure 9:
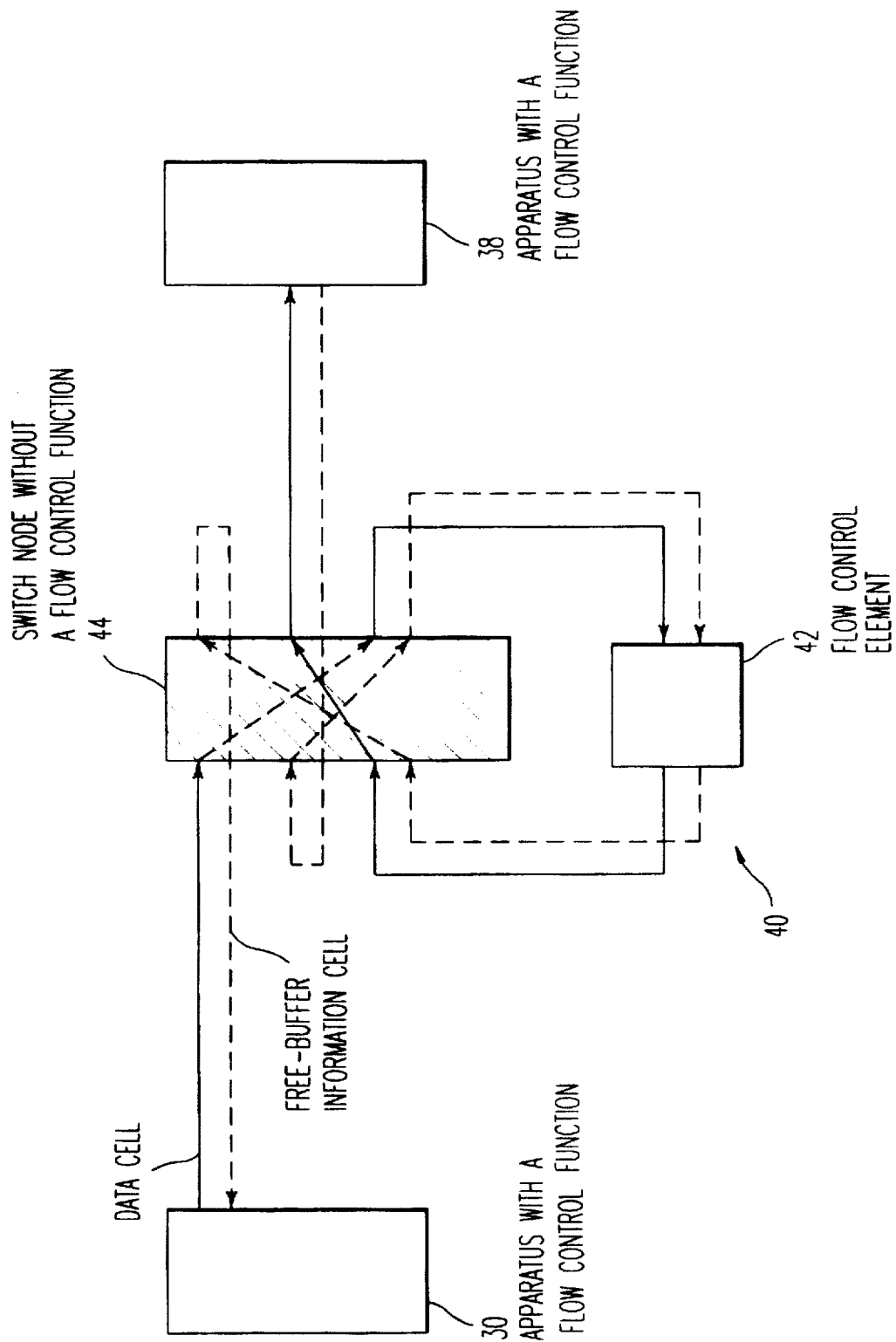
FIG. 9 shows the flow of cells through a flow control apparatus according to the first embodiment of the present invention.

FIG. 9 shows the flow of data cells of the first embodiment of the present invention, and the flow of free-buffer information cells that control streams of the data cells. The cell input of the flow control apparatus 42 inputs both data cells and the free-buffer information cell. Furthermore, the cell output of the flow control apparatus 42 outputs both the data cells and the free-buffer information cells generated by themselves.

FIG. 9 shows two input arrows and two output arrows to the flow control apparatus, but these arrows represent the logical cell paths: the actual physical transmission path is a single input/output in each case.

ATM connections are bidirectional. The flow of data cells in the opposite direction on the connection of the flow of data transmission cells indicated by the continuous line in FIG. 9 can be by the same path as the flow of buffer-free information transmission cells indicated by the dotted line. Also, the flow of free-buffer information cells controlling the flow of these data cells can be by the same path as the flow of data cells indicated by the continuous line.

Figure 10:
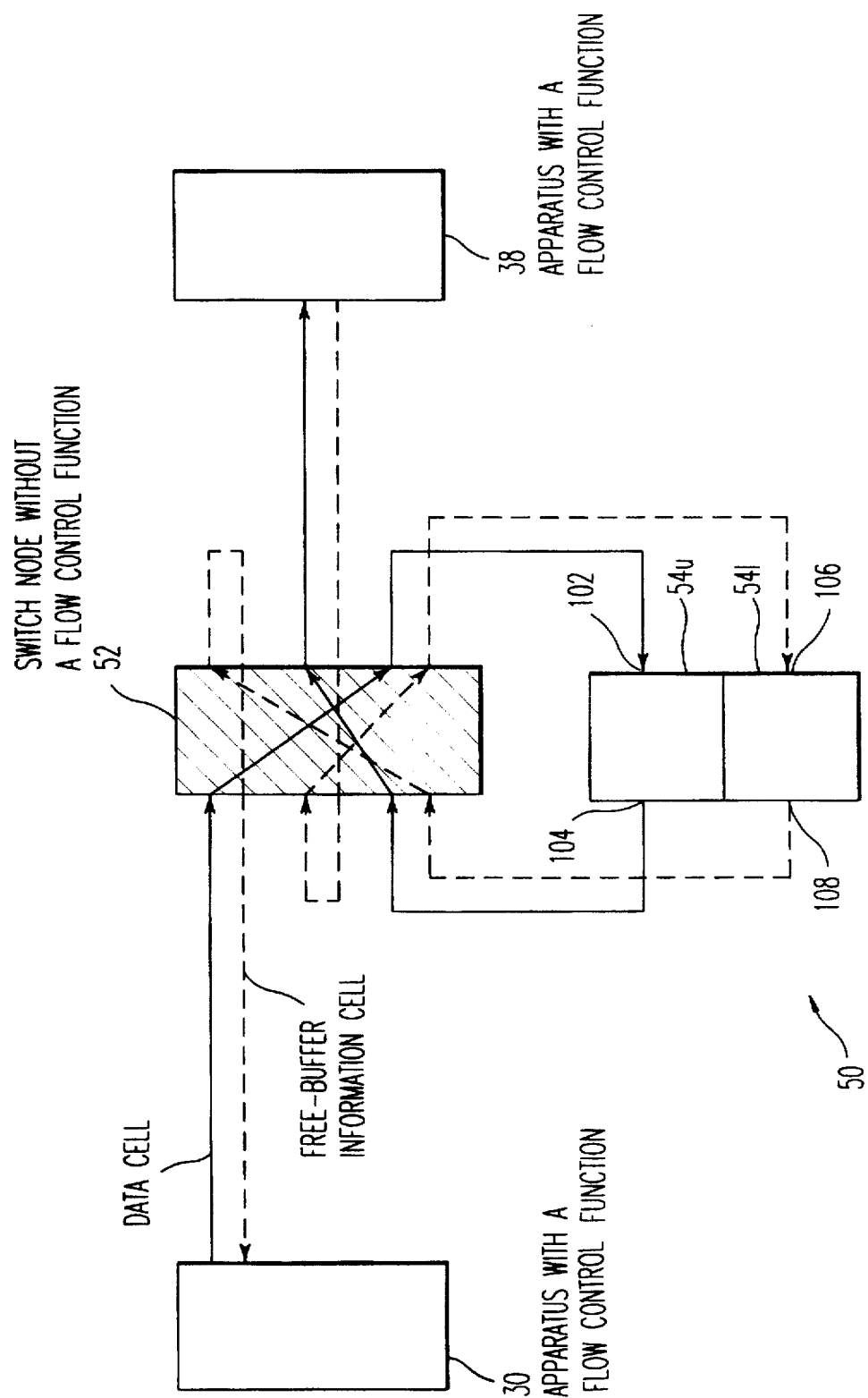
FIG. 10 shows the flow of cells through a flow control according to the second embodiment of the present invention.

FIG. 10 shows an example of the flow of data transmission cells in the second embodiment of the present invention and the flow of free-buffer information cells that control these. In the second embodiment of the present invention, there are two sets of cell input, cell output and buffer.

The data transmission cells that are input to an upper cell input 102 of an upper flow control apparatus 54u of the flow control apparatus 50 of the present invention are stored in an upper buffer therein and output from an upper cell output 104. Output of the cells from the upper cell output 104 is controlled by the free-buffer information cells that are input to a lower cell input 106 of a lower flow control apparatus 541. Also, the condition of the upper buffer is detected and a free-buffer information cell is output from a lower cell output 108 for purposes of control of the input of cells to the upper cell input 102.

The flow of data cells in the opposite direction by the same connection as the flow of data transmission cells indicated by the continuous line in FIG. 10 may be by the same path as the flow of free-buffer information cells indicated by the dotted line. Also, the flow of free-buffer information cells that control the flow of these data cells may be by the same path as the flow of data cells indicated by the continuous line.

Also in accordance with the second embodiment, a data transmission cell that is input to the lower cell input 106 is stored in a lower buffer of apparatus 541 before being output from the lower cell output 108. Output of cells from the lower cell output 108 is controlled by a free-buffer information cell that is input to the upper cell input 102.

Furthermore, a free-buffer information cell is output from the upper cell output 104 for purposes of controlling the cell input to the lower cell input 106 based on the condition of the lower buffer.

Compared with the embodiment of FIG. 9, the embodiment of FIG. 10 can realize about twice the bandwidth for data cells.

Figure 11:
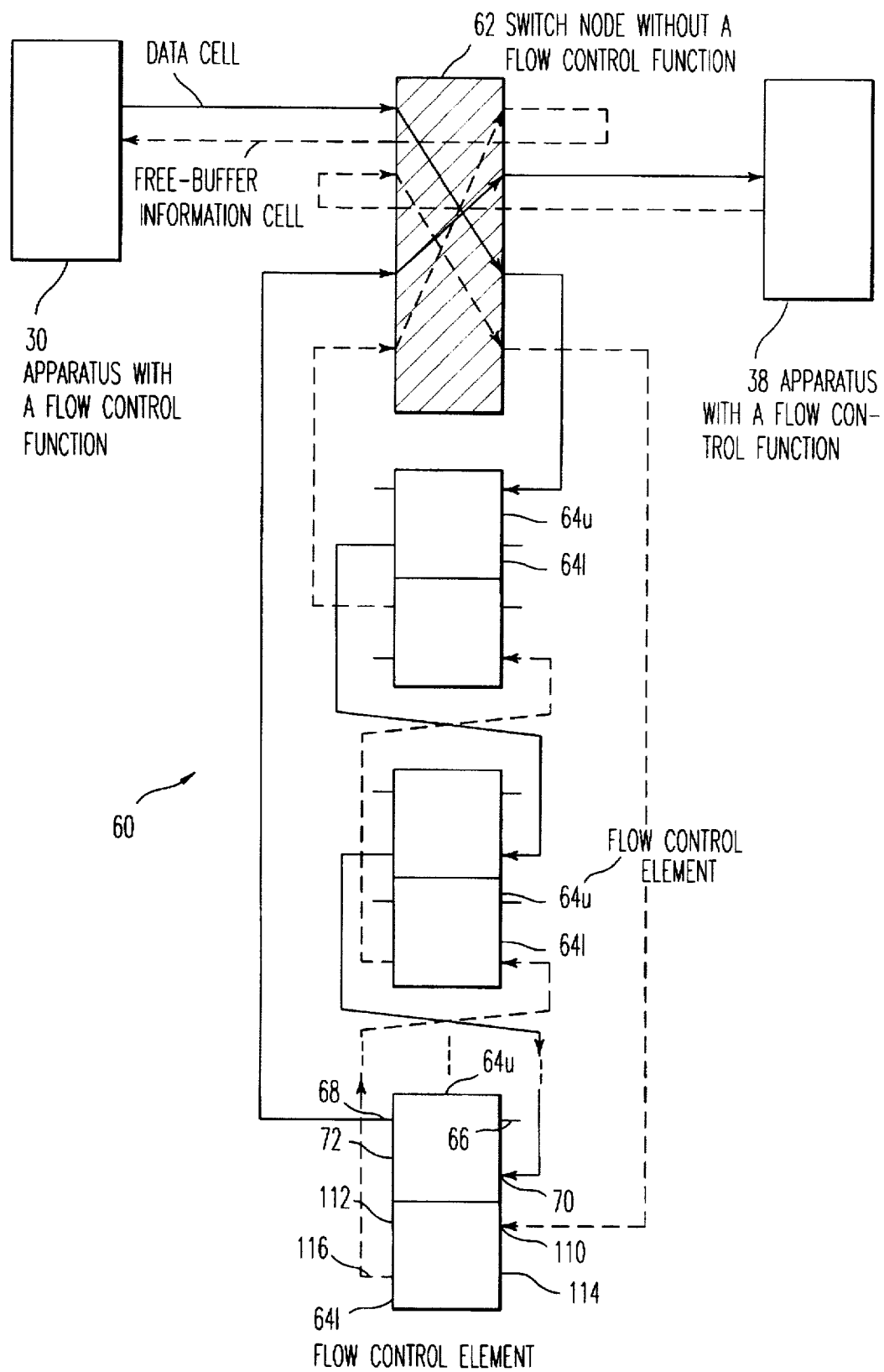
FIG. 11 shows the flow of cells through a flow control apparatus according to the third embodiment of the present invention.

FIG. 11 shows an example of the flow of data cells of the third embodiment of the present invention and the flow of free-buffer information cells that control this. In the third embodiment of the present invention, there are two sets of cell input, cell output and buffer and, in addition, two sets of auxiliary cell input and auxiliary cell output.

According to the third embodiment, data cells that are input to the upper cell input 66 or upper auxiliary cell input 70 are stored in an upper buffer therein and output from the upper cell output 68 or upper auxiliary cell output 72. Cell output from the upper cell output 68 is controlled by the free-buffer infomation cell that is input from a lower cell input 110 of a lower flow control apparatus 641. Furthermore, on detection of the upper buffer condition, a free-buffer information cell is output from a lower cell output 112 in order to control input of cells to the upper cell input 66.

Cell output from the upper expansion cell output 72 is controlled by the free-buffer information cell that is input to the lower auxiliary cell input 114. Also, on detection of the upper buffer condition, a free-buffer information cell is output from lower auxiliary cell output 116 in order to control input of cells to the upper auxiliary cell input 70.

The flow of data cells with the same connection but reverse direction to the flow of data cells shown by the continuous line in FIG. 11 can be by the same path as the flow of free-buffer information cells shown by the dotted line. Furthermore, the flow of free-buffer information transmission cells that control the flow of these data cells can be by the same path as the flow of data cells indicated by the continuous line.

According to the present invention, data cells input to the lower cell input 110 or lower auxiliary cell input 114 are stored in a lower buffer therein and are output from the lower cell output 112 or lower auxiliary cell output 116. Output of cells from the lower cell output 112 is controlled in accordance with the free-buffer information cells that are input to the upper cell input 66. Also, a free-buffer information cell is output from the upper cell output 68 in order to control input of cells to the lower cell input 110, based on the condition of the lower buffer.

Output of cells from the lower auxiliary cell output 116 is controlled by the free-buffer information cell that is input to the upper auxiliary cell input. Also, on detection of the lower buffer condition, a free-buffer information transmission cell is output from the upper auxiliary cell output 72 in order to control the input of cells to the lower auxiliary cell input 114.

By setting up connections as in FIG. 11, free-buffer information cells are transmitted and flow control can be achieved between flow control apparatuses of the present invention connected by means of auxiliary cell inputs and auxiliary cell outputs.

Figure 12:
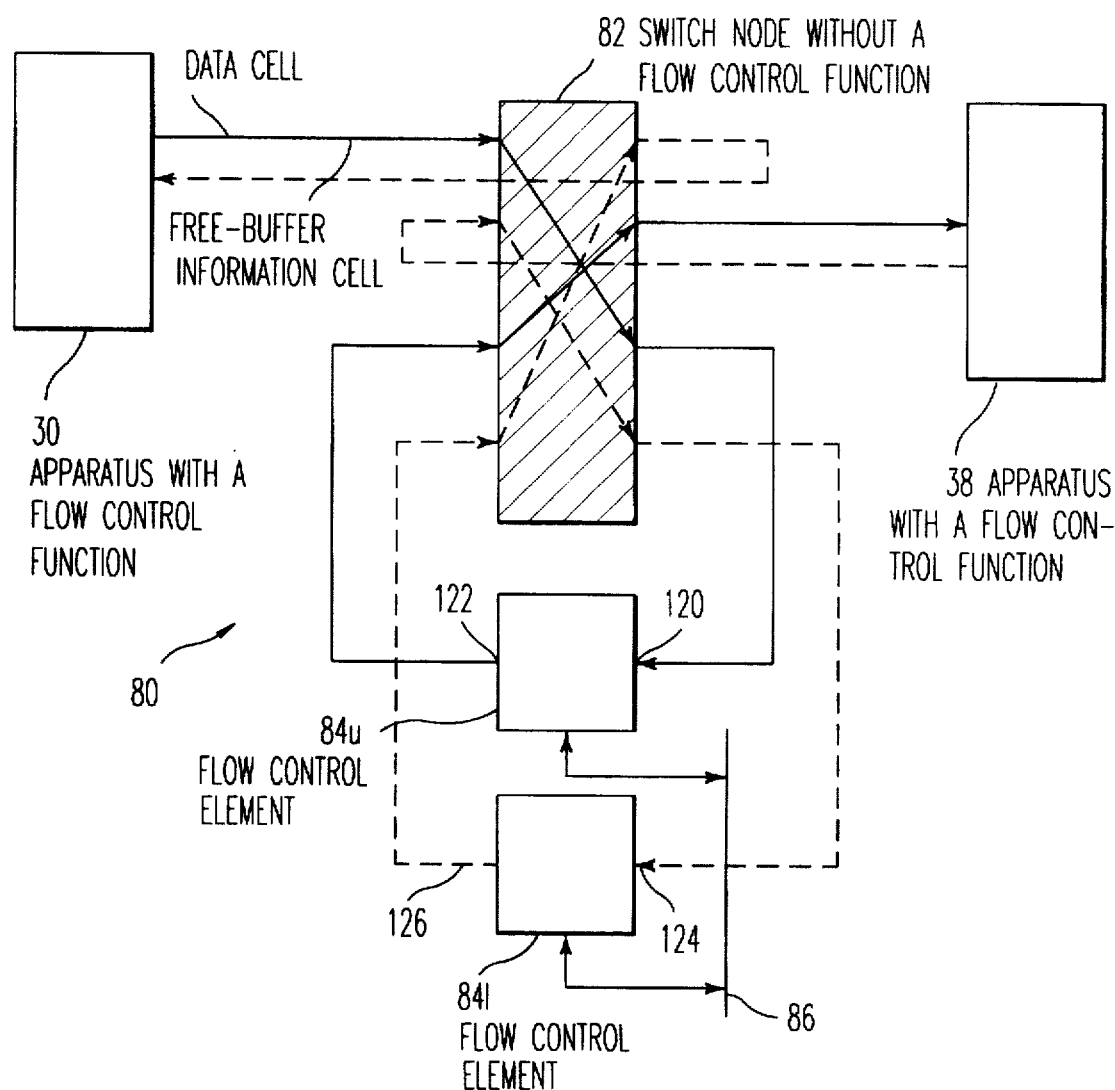
FIG. 12 shows the flow of cells through a flow control apparatus according to the fourth embodiment of the present invention.

FIG. 12 shows an example of the flow of data transmission cells in the fourth embodiment of the present invention and the flow of free-buffer information cells that control this.

Data transmission cells that are input to a cell input 120 of an upper flow control apparatus 84u are stored in an upper buffer therein and output from the upper cell output 122.

Output of cells from the upper cell output 122 is controlled by the free-buffer information cell that is input to a lower cell input 124.

Furthermore, on detection of the condition of the upper buffer, a free-buffer information cell is output from a lower cell output 126 in order to control the input of cells to the upper cell input 120.

Control information obtained from the free-buffer information cells that are received as input are transmitted through the interface 86 that effects connection between the flow control apparatuses 84u and 84l. Furthermore, information relating to the condition of the buffer within either flow control apparatus 84u,84l is transmitted through the interface 86.

The ATM connection is bidirectional. The flow of data cells indicated by the continuous line in FIG. 12 and the flow of data cells by the same connection but with the opposite direction can be by the same path as the flow of free-buffer information cells indicated by the dotted line. Furthermore, the flow of free-buffer information cells that control the flow of these data cells can be by the same path as the flow of data cells indicated by the continuous line.

Figure 13:
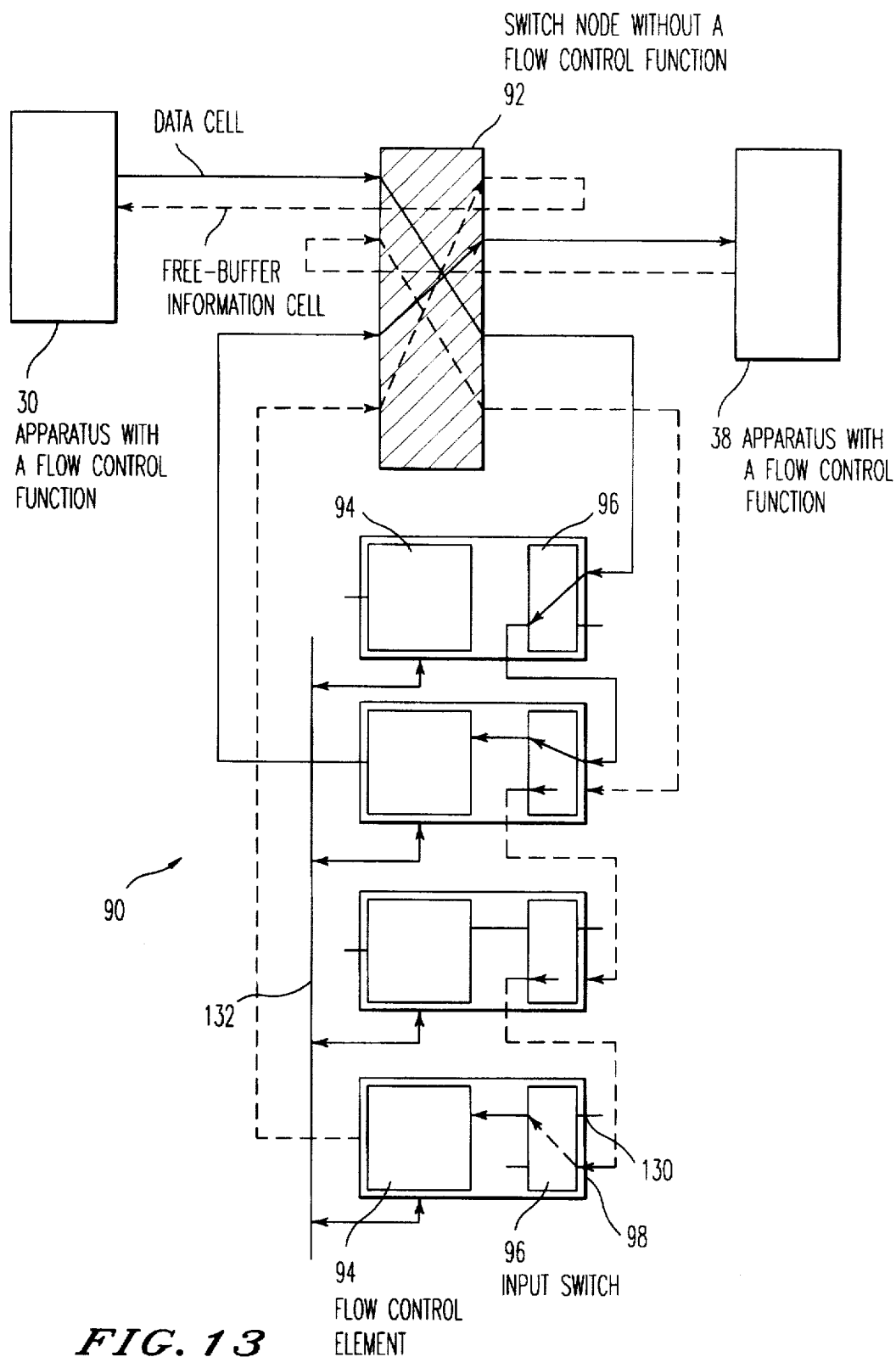
FIG. 13 shows the flow of cells through a flow control apparatus according to the fifth embodiment of the present invention.

FIG. 13 shows an example of the flow of data transmission cells of the fifth embodiment of the present invention and the flow of free-buffer information cells that control this. The flow control apparatus 90 of the fifth embodiment has a layout wherein the flow control apparatus input switch 96 is provided on the input side of the fourth embodiment of the present invention.

The cells that are input to a cell input 130 of the flow control apparatus may either be transferred to the interior of the flow control apparatus by means of the flow control apparatus input switch 96, or may be transferred to the auxiliary cell input 98 of an adjacent flow control apparatus, through an auxiliary cell output 100. The cells that are input to the auxiliary cell input 98 can be changed over by means of the flow control apparatus input switch 96 in the same way as the cells that are input to the cell input 130.

As in the fourth embodiment of the present invention, the control information obtained from the free-buffer information cells that are input is transmitted through an interface 132 that connects the flow control apparatuses. Also, as in the fourth embodiment of the present invention, the information relating to the condition of the buffer within each flow control apparatus 94 is transmitted through the interface 132 connecting the flow control apparatuses.

The ATM connection is bidirectional. The flow of data cells shown by the continuous line in FIG. 13 and the flow of data cells with the same connection but in the opposite direction can be the same path as the flow of free-buffer information cells shown by the dotted line. Furthermore, the flow of free-buffer information cells that control the flow of these data cells may be by the same path as the flow of data cells indicated by the continuous line.

Next, examples of setting up the connections in the first-fifth embodiments will be described.

Figure 14:
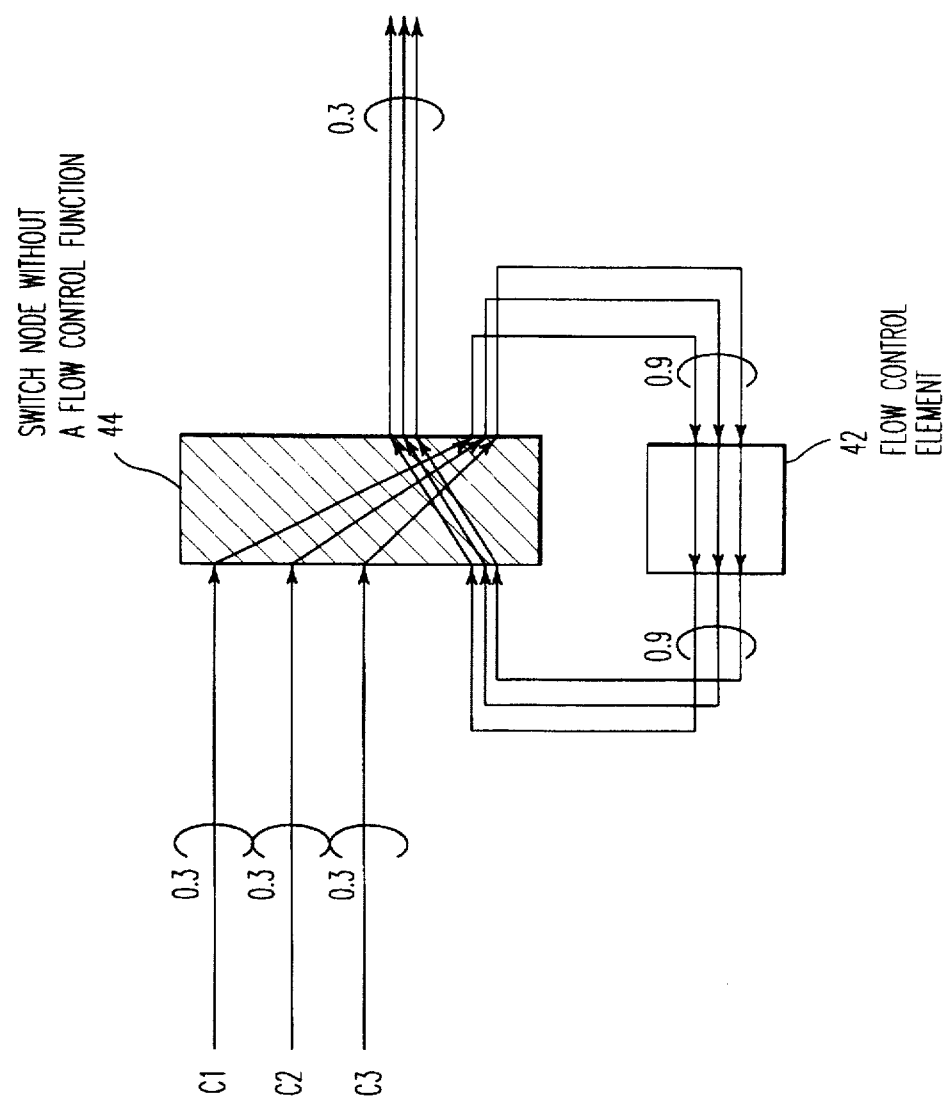
FIG. 14 shows the path of data transmission cells passing through the flow control apparatus of the present invention and a switch node.

FIG. 14 shows the path of the data transmission cells on three connections when three connections are input (C1,C2, C3) from three input ports of a switch node 44 that does not have a flow control function, pass through a flow control apparatus 42 according to the present invention, and are output from a particular output port of the switch node 44.

It is assumed that the peak rates on the inputs to the switch node 44 of the three connections C1,C2, and C3 are respectively 0.3. Also, it is assumed that the bandwidth of the input/output port of the switch node 44 is in this case 1.0. It is further assumed that C1,C2 and C3 normally do not transmit cells but, from time to time, transmit cells at peak rate.

Considering the case in which data transmission cells are transmitted at peak rate simultaneously through the three connections, a total bandwidth of 0.9 will be required by the total of the three connections at the output port of the switch node 44. Cell loss will therefore not occur if the total of the peak rates of the respective output ports is no more than 1.0. (In actual practice, there is a certain amount of delay variation of the cells, so it is necessary to provide for some margin regarding the total of the cell rates. However, for the present, for simplicity in description, it is assumed that congestion does not occur and quality can be guaranteed if this sum is no more than 1.0.) One viewpoint is that if the probability of data cells being transmitted simultaneously at peak rate on the three connections is low, it would be sufficient to have a switch node output port bandwidth of about 0.3. However, if the data cells are transmitted simultaneously at peak rate on multiple connections, there will be a large number of cells waiting in the buffer in the switch node, and this can cause cell loss due to buffer overflow.

As shown in FIG. 14, the peak rate of the total of data cells transmitted through the three connections is controlled so that it does not exceed 0.3, by means of traffic parameters given beforehand when data cells are output diverted to the flow control apparatus of the present invention. This enables a better utilization ratio of the bandwidth at the output port of the switch node to be achieved. Furthermore, a bandwidth margin of 0.7 is produced, which can be employed by other connections.

The flow control apparatus of the present invention monitors the condition of its internal buffer, and transmits free-buffer information cells to control transmission of data cells to apparatuses having a flow control function which are upstream thereof, such that its buffer does not overflow. Due to this control, cell loss due to buffer overflow cannot occur even when data cells arrive at the peak rate of 0.3 simultaneously from multiple connections.

Figure 15:
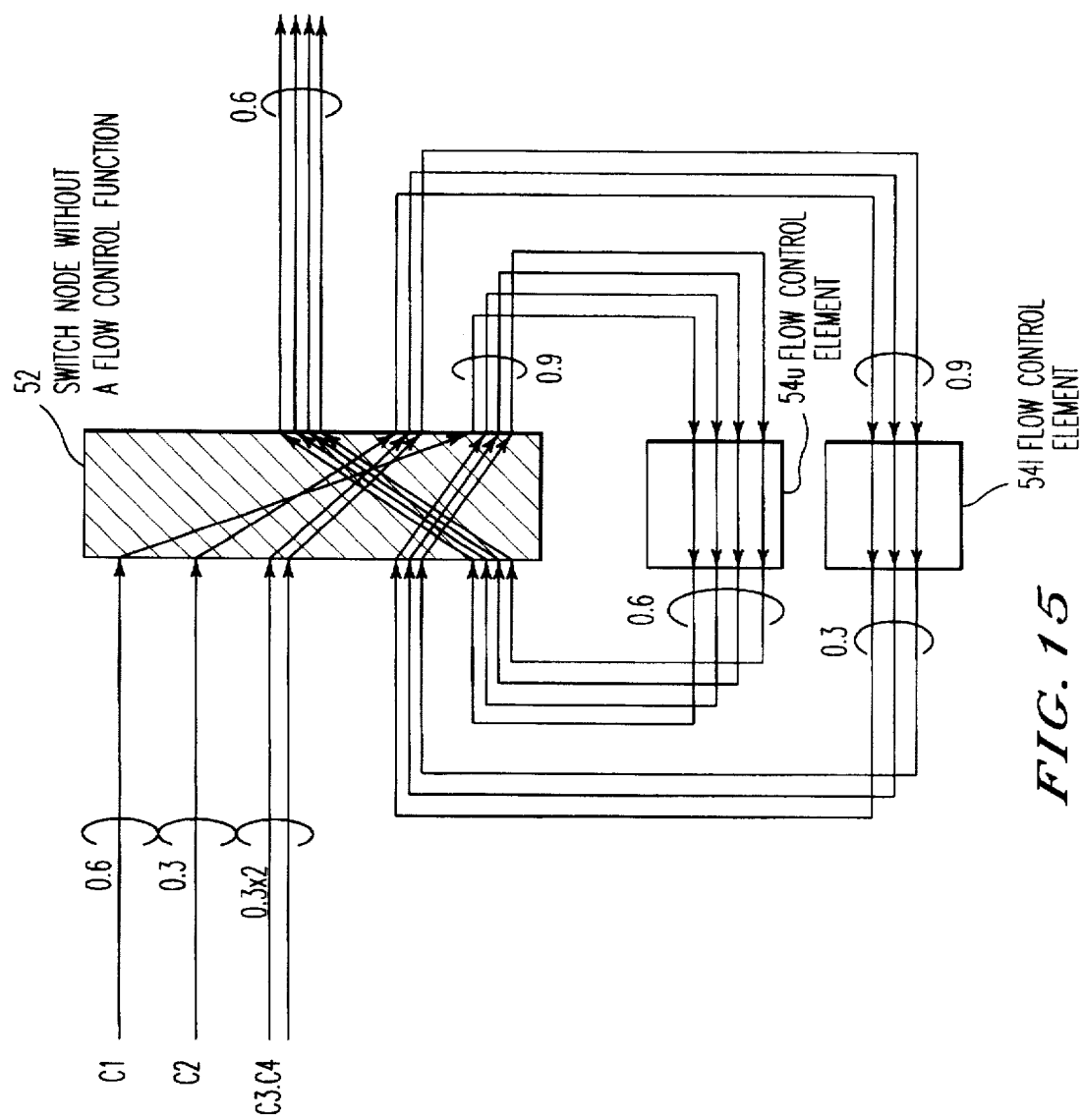
FIG. 15 shows the path of data transmission cells through a flow control apparatus according to the present invention and a switch node.

A method of setting up connections that can be applied to the first-fifth embodiments of the present invention will now be described with reference to FIG. 15. FIG. 15 shows the case in which a plurality of flow control apparatuses 54u,54l according to the present invention (two in the case of FIG. 15) are connected to a single switch node 52 that does not have a flow control function, and data cells are transmitted via this plurality of flow control apparatuses 54u,54l.

In FIG. 15, there are four input connections, C1, C2, C3 and C4 to the switch node 52 that does not have a flow control function. The peak rates are respectively 0.6, 0.3, 0.3, and 0.3. Output is delivered with a total bandwidth taken as 0.6 from a single output port of the switch node 52 through these four connections. Since the total of these four bit rates exceeds 1.0, this cannot be implemented by a single flow control apparatus according to the present invention as in the connection set up of FIG. 14 described above.

In FIG. 15, C2, C3 and C4 are first routed to flow control apparatus A 54l. It is assumed that the total peak rate of these three connections is reduced to 0.3 using the technique of FIG. 14. After this, this output is routed once to flow control apparatus B 54u through the switch node 52. In addition, the total peak rate of C1, C2, C3 and C4 that is finally output from flow control apparatus B 54u can be taken as 0.6 by routing C1 only to flow control apparatus B.

Regarding connections C2, C3, and C4, depending on the buffer condition of flow control apparatus B, free-buffer information cells are transmitted to flow control apparatus A from flow control apparatus B.

Due to the routing of the connections as in FIG. 15, more connections can be handled than in the case of FIG. 14. More connections can be handled by connecting flow control apparatuses of the present invention to even more switch nodes not having a flow control function.

A connection set up method that can be applied to the third embodiment of the present invention will now be described with reference to FIG. 16. In order to set up connections as in FIG. 16, the third embodiment of the present invention having auxiliary cell inputs and auxiliary cell outputs is necessary.

Figure 16:
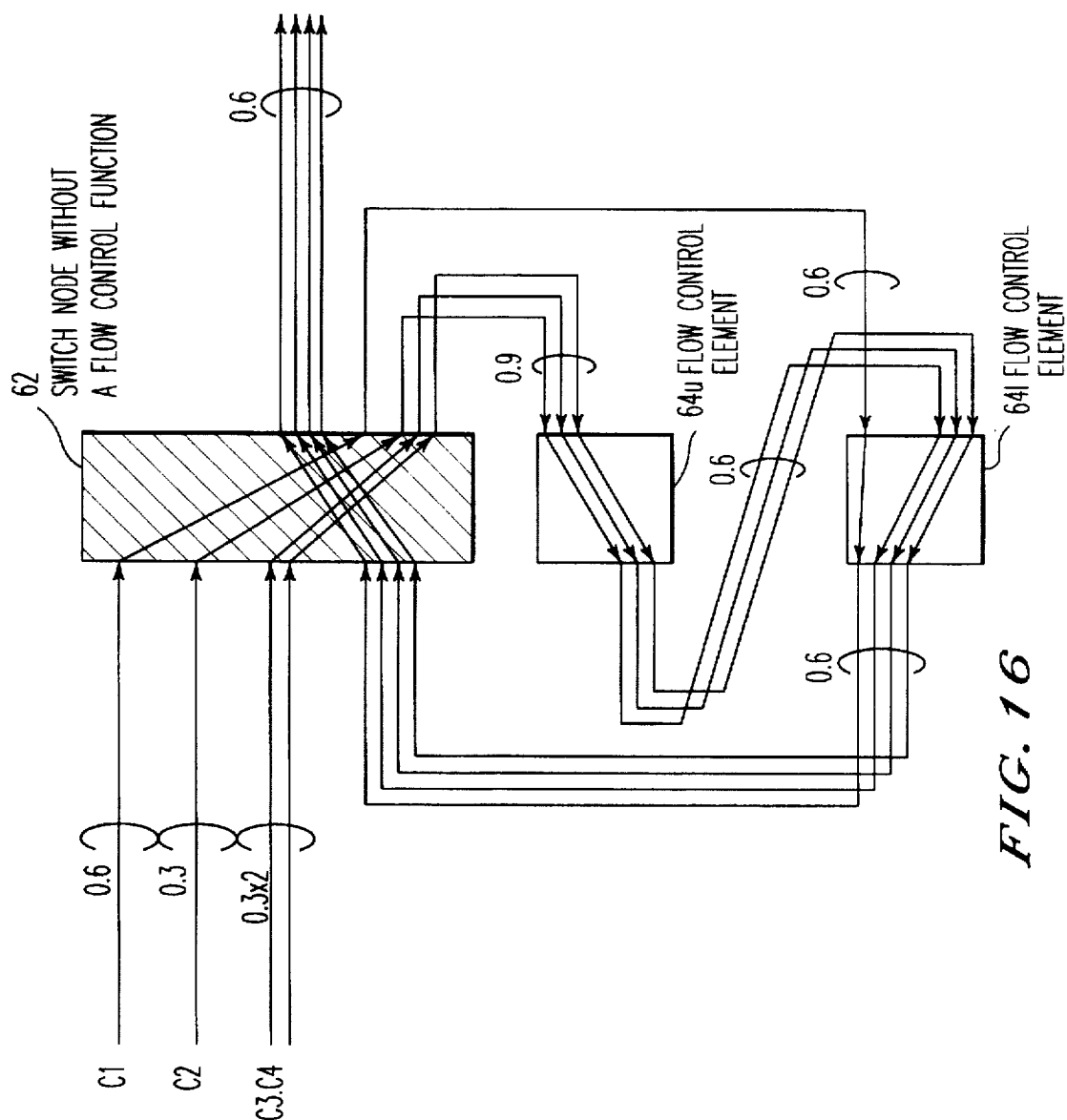
FIG. 16 shows the path of data transmission cells through a flow control apparatus according to the present invention and a switch node.

In FIG. 16, four connections: C1, C2, C3 and C4 are input to a switch node 62 not having a flow control function. The peak rates are respectively 0.6, 0.3, 0.3 and 0.3. These four connections are output with a total peak rate made equal to 0.6 from a given one output port of the switch node 62, as in FIG. 15.

In FIG. 16, connections C2, C3 and C4 are first routed to flow control apparatus A 64u of the present invention. In this flow control apparatus A, the total bandwidth of these three connections is reduced to 0.6, and output is delivered from the auxiliary cell output of flow control apparatus A. Connections C2, C3 and C4 are input to the auxiliary cell input of flow control apparatus B 641 and are then output through the switch node 62 with their total peak rate made 0.6 together with connection C1, which is input only to the cell input of flow control apparatus B.

In FIG. 15, it was necessary for the respective peak rates of connections C2, C3 and C4 to be below 0.3. This is because the peak rate of the link from flow control apparatus A to flow control apparatus B was 0.3, since it was necessary to effect multiplexing on to a single physical transmission link (cell input of flow control apparatus B) together with the peak rate (0.6) of connection C1. For example, if it is assumed that connection C2 is 0.6, and C3 and C4 are respectively 0.15, the peak rate 0.6 on the input of connection C2 cannot pass through this transmission link, since the output of flow control apparatus A of FIG. 15 is 0.3. By use of the auxiliary cell input and auxiliary cell output as in FIG. 16, this problem is solved, and, so long as the sum of their peak rates is no more than about 0.9, the peak rates of the connections C2, C3 and C4 can be individually set up to 0.6.

In FIG. 14, FIG. 15 and FIG. 16, it is assumed that, between the flow control apparatus of the present invention and a downstream apparatus having a flow control function, there are switch nodes that could not write congestion information in free-buffer information cells, or switch nodes that are not capable of appending congestion-experienced information to data cells. In this case, in order to guarantee quality at such switch nodes, it is necessary to control the traffic by setting predetermined traffic parameters for quality-quaranteeing, e.g., a peak rate, in the flow control apparatus of the present invention.

If all the switch nodes between the flow control apparatus of the present invention and the downstream apparatus having a flow control function possess a function of being able to set EFCI bit of cells and/or a function of re-writing the content of control cells or free-buffer information cells, the flow control apparatus of the present invention operates effectively even if no predetermined traffic parameters for guaranteeing transmission quality is specially set. It suffices to control cell output using solely the free-buffer information cells that are transmitted from downstream of the flow of data cells, without applying any traffic parameters for guaranteeing transmission quality.

Next, an example of a functional layout is described. After this, a specific example for the functional layout of each embodiment of the invention is described. These are described in terms of the logical structure of the function: this may differ from the actual physical structure. For example, if the required specification values regarding throughput of the flow control apparatus of the present invention are comparatively small, the actual hardware may comprise memory, a processor and a peripheral LSI and the functions can be implemented by software.

Figure 17:
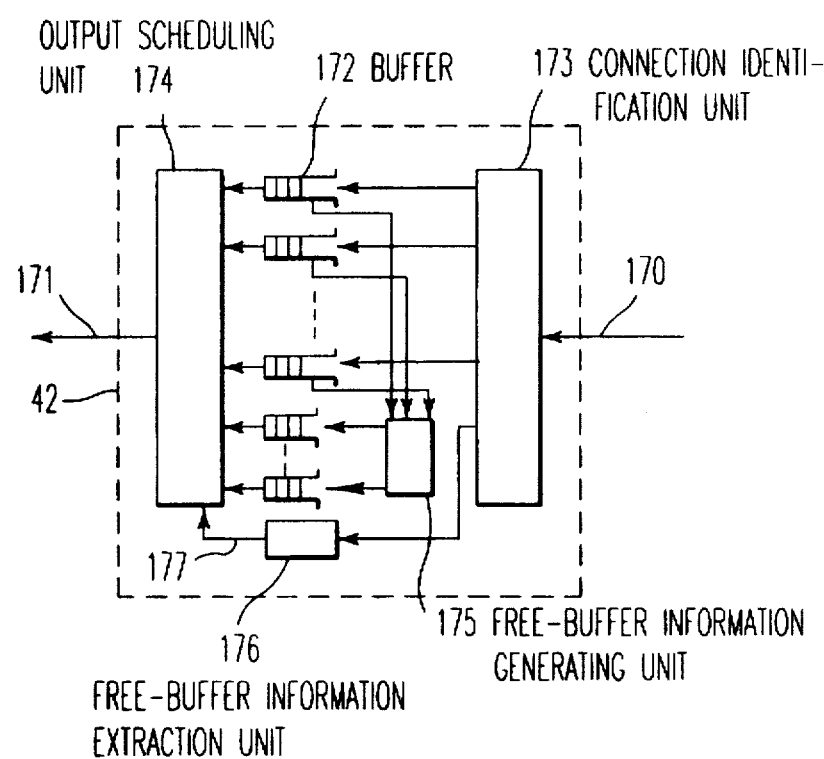
FIG. 17 shows the functional layout of flow control apparatus of the first embodiment of the present invention.

FIG. 17 shows an example of the functional layout of a flow control apparatus of the first embodiment of the present invention.

The flow control apparatus 42 according the first embodiment of the present invention includes a single cell input 170 and a single cell output 171. Cells through the cell input 170 are received into a buffer for each appropriate connection 172 in accordance with a cell connection identifier by a connection identification unit 173. A function may be provided capable of detecting cells with a wrong connection identifier.

It is not necessarily the case that data transmission cells that are input to the cell input 170 are immediately transmitted to the cell output 171. Because, for the buffers of each connection 172, buffer reading of each connection is controlled such that buffer overflow and loss of data transmission cells do not occur at downstream switch nodes not having a flow control function and/or downstream apparatuses having a flow control function. In short, the buffers of each connection have a function of temporarily storing data cells that are transmitted from upstream apparatuses having a flow control function.

In the case of the credit-based method, equal buffer amounts are allocated to all flow controlled connections that pass through flow control apparatuses. Fairness between the connections can therefore be maintained. However, it is possible to dynamically alter the allocation of buffer amounts by, for example, reducing the amount of buffer allocated to connections of low cell rate.

In the case of the rate-based method, the buffer can be shared among a plurality (or all) of the connections.

Cells accumulated in the buffer of each connection are output from the cell output by means of an output scheduling unit 174, in accordance with control to be described.

Information relating to the amount of free-buffer area in respect of each connection is sent to a free-buffer information generating unit 175. Information relating to the amount of free-buffer area includes, for example, the following items of information:

1) "N cells have been output from the buffer for each connection, so a further N cells can be stored in the buffer of each of these connections."

2) "The numbers of cells stored in the buffer of each connection exceeds a certain number (or is less than a certain number)".

3) "The cell rate should be as follows (target transmission rate)"

When congestion-experienced information is written in a cell, it may be arranged that this information is sent to the free-buffer information generating unit 175. This information may include, for example, the following item of information: "Congestion has not occurred at switch nodes on the link from the upstream apparatus having a flow control function (or: congestion has occurred)".

It is also possible to adopt an arrangement whereby when control cells for congestion control are received in the same direction as data transmission cells, their information is sent to the free-buffer information generating unit 175. This information may include, for example, the following information items:

1) "Congestion has not occurred on switch nodes on the path from the upstream apparatuses having flow control functions (or: congestion has occurred)"
2) "Current cell rate of the connection at an upstream apparatus having a flow control function:"
3) A control cell itself.

In the case of a control method whereby the "target cell rate" is transmitted to an upstream apparatus having a flow control function, the free-buffer information generating unit 175 finds the target cell rate by totalling the "current cell transmission rates".

The free-buffer information generating unit 175 generates a free-buffer information cell based on these items of information. This free-buffer information cell is output from the cell output 171 after passing through the output scheduling unit 174. In the case of an arrangement whereby control cells for congestion control are transmitted together with data cells from upstream, a construction may be adopted wherein such cells are looped back so that they are output from the cell output 171. (These loopback cells are also called "free-buffer information cells" in this specification). These loopback cells convey information regarding the amount of free buffer area in the flow control apparatus. The free-buffer information cells are transmitted to upstream apparatus, and control the traffic from upstream apparatus having a flow control function.

A method of transmitting free-buffer information cells to upstream apparatus having a flow control function can be implemented for example by the flow control apparatus of the present invention converting its connection identifier into a connection identifier for flow in the reverse direction to the flow of data cells from upstream.

As one aspect of this, free-buffer information cells for purposes of controlling the traffic that is output from the flow control apparatus are transmitted from a flow control apparatus having a flow control function which is downstream thereof. The free-buffer information cells are input to the cell input 170 and transferred to the free-buffer information extraction unit 176 by the connection identification unit 173.

The free-buffer information 177 that is extracted from the free-buffer information cell by the free-buffer information extraction unit 176 is transmitted to the output scheduling unit 174, and controls transmission of data cells that are output from the flow control apparatus. The control by the output scheduling unit is as follows.

For example, when the information "since N cells have been output from buffer for each connection, a further N cells may be stored in the buffer of each of these connections" is received from a downstream apparatus having a flow control function, the number of cells not greater than N is sent to the connection. Therefore buffer overflow will not occur at downstream apparatus therefrom having a flow control function.

For example, the cell rate for each connection from the flow control apparatus is decreased gradually, and, when the information "the number of cells stored in the buffer of each connection is smaller than a certain number" or "there is no congestion at switch nodes on a path to a downstream apparatus having a flow control function" is received from a downstream apparatus having a flow control function, the cell rate of that connection is increased in accordance with a predetermined algorithm. The cell rate can thereby be increased within a range such that buffer overflows at a downstream apparatus having a flow control function does not occur.

Further for example, when the information "restrict the cell rate to the following rate" is sent by the buffer-free information cell, the cell transmission rate is made to be less than this rate. In this way, the efficiency of link utilization of paths to downstream switch nodes and downstream flow control apparatus can be good, while cell loss ratio is sufficiently low.

Figure 18:
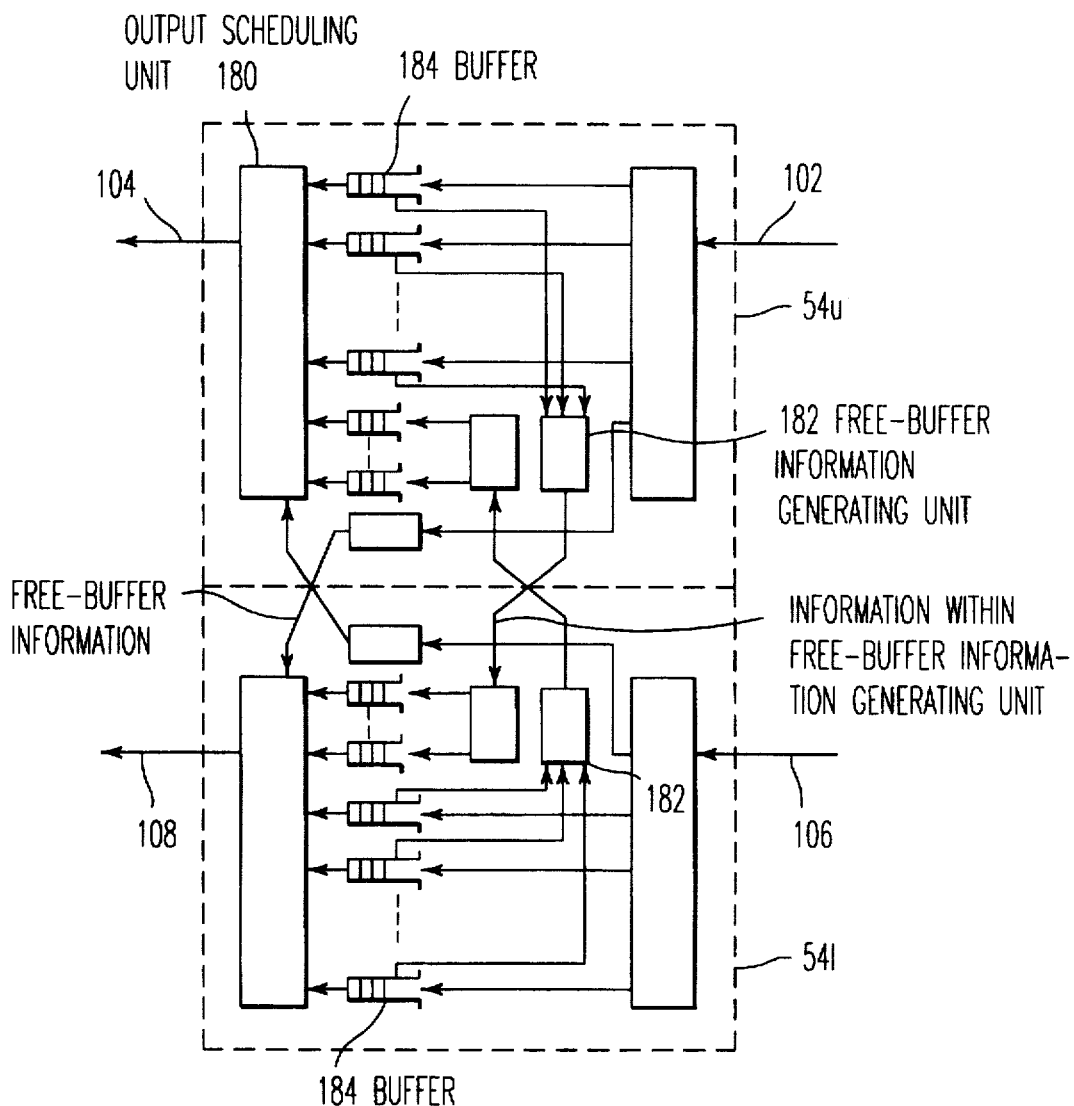
FIG. 18 shows the functional layout of flow control apparatus of the second embodiment of the present invention.

FIG. 18 shows an example of the functional arrangement of a flow control apparatus of the second embodiment of the present invention.

In the second embodiment of the present invention, the functional arrangements of the first embodiments as shown in FIG. 17 are arranged in parallel. However, in the second embodiment there is an additional feature regarding the transmission path of control information when free-buffer information cells are exchanged.

The free-buffer information cells that control the data cells output from the upper cell output 104 of the second embodiment are input from the lower cell input 106 as shown in FIG. 18. Meanwhile, data cells in a flow that is in the opposite direction but by the same connection as the data cells are output from the lower cell output 108, and free-buffer information cells that control these are input from the upper cell input 102. Free-buffer information cells that are input to the cell input on one side have their free-buffer information extracted and control the output scheduling unit 180 for cell output on the opposite side.

Also, free-buffer information prepared by the free-buffer information generating unit 182 that monitors the buffer for each connection 184 on a particular side is sent to the opposite side, and is transmitted as free-buffer information cells from the cell output on the opposite side.

Such a path set up has the following two advantages. First, although there is a high probability that throughput of data cells will be needed up to about the bandwidth of the physical link, since the connection in an ATM is bidirectional, by using only one of the first embodiment of the present invention, no more than about one-half of the bandwidth of the physical link can be used in one direction. By routing the flow of mutually opposite directions of a single connection as in the second embodiment of the present invention, to different cell inputs, it becomes possible to utilize a bandwidth up to the bandwidth of the respective physical link for a single direction. The second is that, on the same connection, the path of data cells and the path of free-buffer information cells that control the data cells of the flow in the opposite direction are the same. As a result, switch nodes that do not have a flow control function do not need to distinguish these cells and can be set up so that they pass through the same route. This therefore has the advantage that when adding routing tags at the switch nodes in order to direct the cells to a flow control apparatus, such tags can be appended without discriminating between these cells.

In FIG. 18, the buffer is divided into two buffers but the benefits of the present invention are unchanged even in the case of a system in which the same buffer resource is shared by the two sides. Sharing has the advantage that a limited amount of buffer can be more efficiently utilized.

Figure 19:
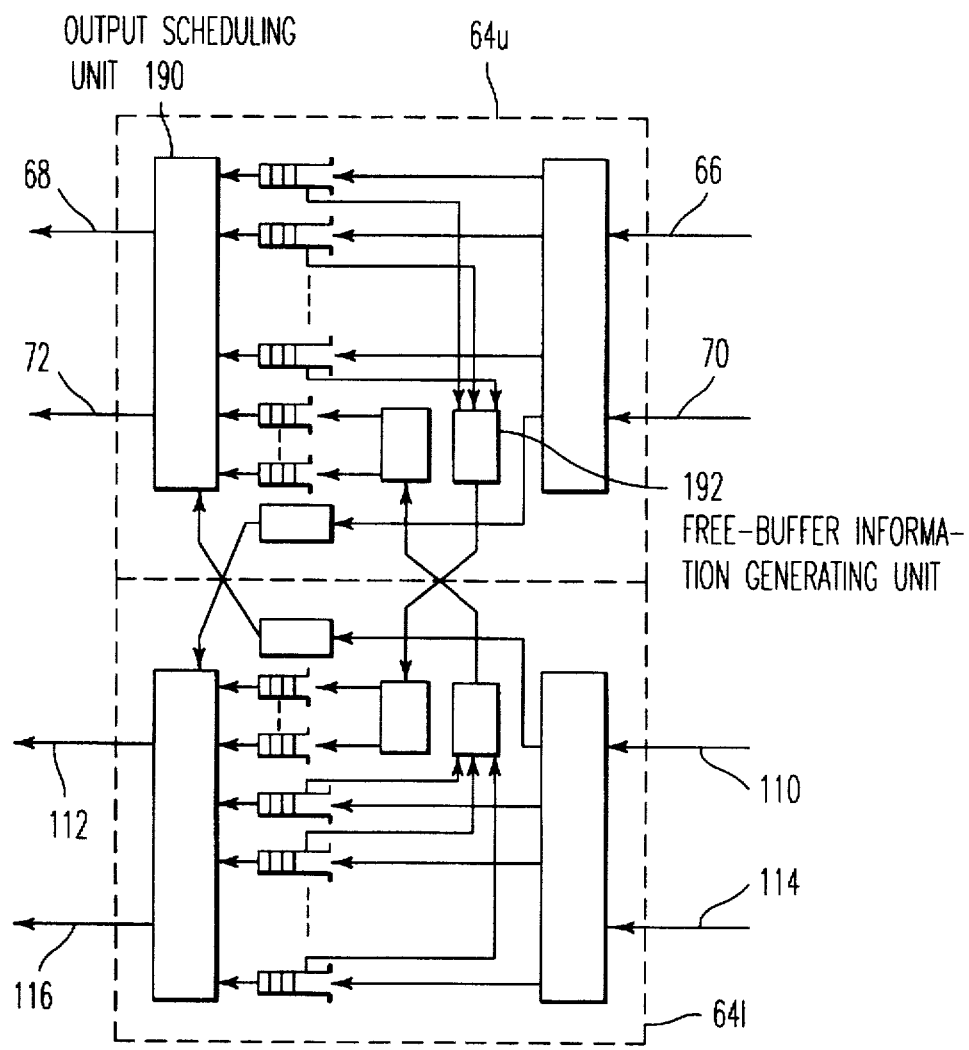
FIG. 19 shows the functional layout of flow control apparatus of the third embodiment of the present invention.

FIG. 19 shows an example of a functional layout of the flow control apparatus of the third embodiment of the present invention. In the case of the third embodiment, two sets of auxiliary cell inputs 70,114 and auxiliary cell outputs 72,116 are added to the second embodiment of the present invention described with reference to FIG. 18.

Free-buffer information cells that control the data cells output from the upper cell output 68 in the third embodiment are input to the lower cell input 110. Meanwhile, data cells carried by the same connection as these data cells but in the opposite direction are output from the lower cell output 112, and free-buffer information cells that control these are input to the upper cell input. Free-buffer information cells that are input from the cell input on one side have their free-buffer information extracted, and this information is used to control the output scheduling unit 190 for cell output on the opposite side.

Also, free-buffer information prepared by the free-buffer information generating unit 192 on one side is sent to the opposite side and is transmitted from the cell output on the opposite side as free-buffer information cells.

Regarding the relationship also of the auxiliary cell input and auxiliary cell output, in the same way, the free-buffer information cells that control the data cells that are output from the upper auxiliary cell output 72 of the third embodiment are input to the lower auxiliary cell input 114 as shown in FIG. 19. Meanwhile, data cells constituting a flow on the same connection as these data cells but in the opposite direction are output from the lower auxiliary cell output 116, and free-buffer information cells that control these are input to the upper auxiliary cell input 70. The free-buffer information cells that are input to the auxiliary cell input on one side have their free-buffer information extracted, and this is used to control the output scheduling unit for auxiliary cell output on the other side.

Also, free-buffer information prepared by the free-buffer information generating means on one side is sent to the other side and transmitted from the other-side auxiliary cell output as free-buffer information cells.

In FIG. 19, the buffer is divided into upper and lower buffers, but the benefits of the present invention are unaltered by a system in which the same buffer resource is shared by both sides.

An ATM connection is bidirectional. In the first embodiment of the flow control apparatus of the present invention, the respective flows in both directions of the same connection are handled by the same flow control apparatus. Also, the second and third embodiments of the present invention have a construction in which two flow control apparatuses of the first embodiment are combined; thus, when the flow in one direction of a connection passes through one side of the flow control apparatus of the present invention, the flow in the reverse direction by the same connection passes through the opposite side of the flow control apparatus.

Figure 20:
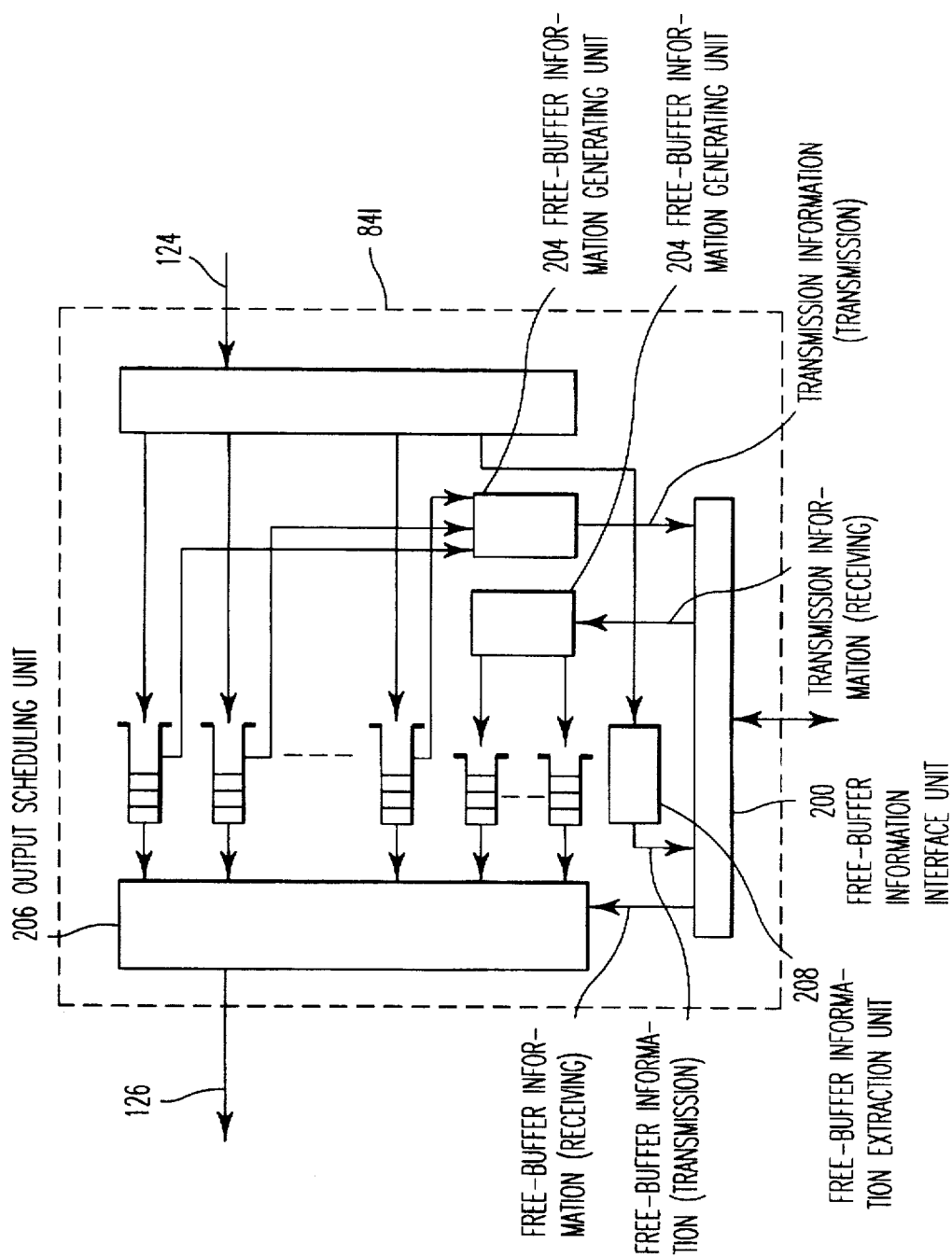
FIG. 20 shows the functional layout of flow control apparatus of the fourth embodiment of the present invention.

FIG. 20 shows a functional layout of the fourth embodiment of the flow control apparatus of the present invention. In this embodiment, the second embodiment of the flow control apparatus described with reference to FIG. 18 is halved, and a free-buffer information interface unit 200 is added. In cases where only one flow control apparatus is connected to a switch node, the fourth embodiment of the present invention is basically the same as the first embodiment. The fourth embodiment of the present invention is an arrangement in which flows in both directions of each connection as shown in FIG. 20 can be handled by respective separate flow control apparatus of the present invention (this is an arrangement in which they can also be handled by the same flow control apparatus.) This provides the advantage that, when a plurality of flow control apparatuses are connected to a switch node, the restrictions on selection of flow control apparatuses passing the flow of each connection can be reduced during connection set up. When setting up connection to a particular switch node, it is necessary to select which flow control apparatus of the plurality of flow control apparatuses the connection is to be set up to pass through. The policy in selection may be, for example, to evenly disperse the load on cell output of each flow control apparatus. By employing the fourth embodiment of the present invention, it is possible to freely select the flow control apparatus that can respectively set up flow of bidirectional connections, and it is possible to disperse as far as possible cell output load of the various flow control apparatuses.

The operation of the fourth embodiment of the flow control apparatus of the present invention will not be described for the case where a flow control system is employed that makes use of control cells in a rate control system. The operation that is here described can also be applied to other embodiments of the present invention.

For example, there may be the following information in the payload of a control cell:

1. Direction bit: indicates whether the cell has been looped back or not.
2. Current cell rate: cell rate of the connection at this time of an upstream apparatus having a flow control function.
3. Explicit cell rate: requested value, i.e., "transmit below this cell rate" sent to upstream apparatus having a flow control function, calculated in downstream apparatus having a flow control function and switch nodes through which the data cells pass. Upstream apparatus having a flow control function have written into them the desired transmission rate, as initial value.

The buffer condition of each connection of the flow control apparatus of the present invention is monitored by the free-buffer information generating unit 202 (upstream stage). In addition, the free-buffer information generating unit 202 (upstream stage) has the function of averaging the current cell rates that are written in the control cells. It is assumed that the averaged current cell rate is much larger than the ideal transmission rate when the free-buffer area is smaller than some threshold, and that the averaged current cell rate is much smaller than the ideal transmission rate when the free-buffer area exceeds some threshold. Based on this concept, the "fair cell rate" of the connections passing through the flow control apparatus of the present invention can be determined. Furthermore, in cases where it is possible that buffer overflow at each connection may occur due to congestion, cell loss due to such buffer overflow can be prevented by setting this "fair cell rate" to a considerably lower value.

When the control cells arrive, in case the explicit cell rate that is written into the payload of the control cells is larger than a numerical value calculated from the "fair cell rate", the "fair cell rate" is written into the explicit cell rate field. Also, the direction bit of the control cell is rewritten to a value indicating that the cell has already been looped back.

This control cell is transmitted to the free-buffer information interface unit 200.

The free-buffer information interface unit 200 identifies which flow control apparatus has been passed through by the flow on the same connection but with opposite direction as the flow on the connection to which the arriving control cells belong, and transmits to this thus-identified flow control apparatus the information contained in the free-buffer information generating unit 204 (in this case, a control cell).

The flow control apparatus that has received this information effects transmission to the internal free-buffer information generating unit 204, and transmits this as a free-buffer information cell to the output scheduling unit 206. The free-buffer information cell is rapidly output from the cell output of this flow control apparatus, and is transmitted to an upstream apparatus having a flow control function through the switch node.

The "fair cell rate" of data cells at switch nodes not having a flow control function through which the cells pass may be calculated during transmission. This value and the explicit cell rate of the free-buffer information cells are compared by some algorithm and, depending on the result, the explicit cell rate field is re-written.

After a flow control apparatus has received a free-buffer information cell from the cell input, it transmits this cell to the free-buffer information extraction unit 208. The difference between a control cell and a free-buffer information cell can be identified by the direction bit. The explicit cell rate is extracted by the free-buffer information extracting unit 208 as free-buffer information. The free-buffer information interface unit 200 identifies through which flow control apparatus the free-buffer information cells that are input to the flow control apparatus control have passed to determine the flow of the connection, and transmits the free-buffer information (explicit transmission rate) to this thus-identified flow control apparatus. Once the identified flow control apparatus has received this information, this flow control apparatus transmits the information to the output scheduling unit 206 and sets the cell transmission rate of the data cells of the connection to be controlled to this value, or below it.

Also, the output scheduling unit 206 outputs from the cell output a control cell, for each connection, every time a fixed number of data cells are transmitted.

The free-buffer information interface unit 200 mutually connects a plurality of flow control apparatuses and mutually transmits free-buffer information and the transmission information in the free-buffer information generating unit. The interface between flow control apparatuses can easily be implemented by an arrangement wherein these are mutually connected, for example through a bus.

Figure 21:
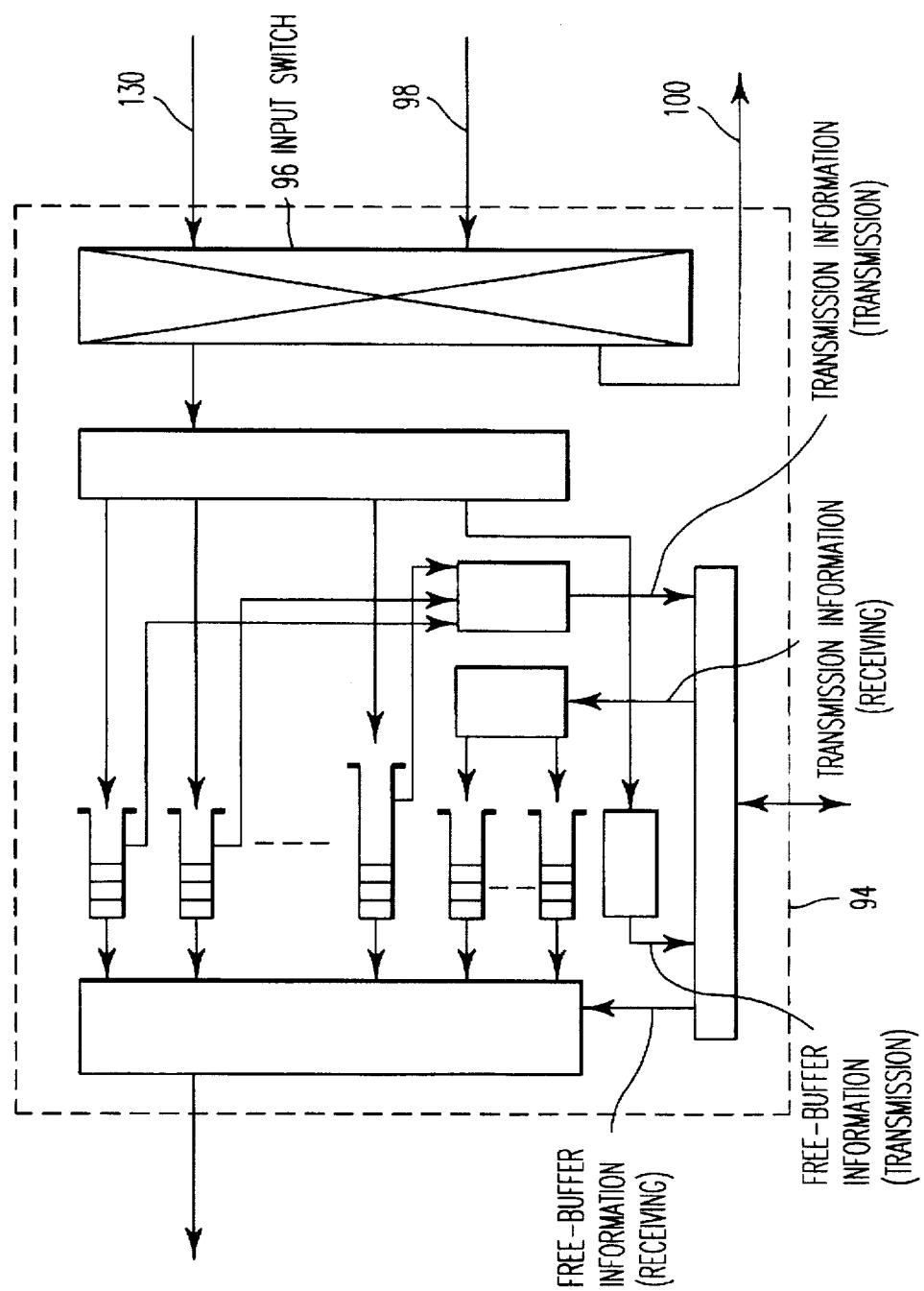
FIG. 21 shows the functional layout of flow control apparatus of the fifth embodiment of the present invention.

FIG. 21 shows a structural layout of the fifth embodiment of the flow control apparatus of the present invention. This is a construction wherein a flow control apparatus input switch is added on the input side of the fourth embodiment of the present invention described with reference to FIG. 20.

In the fifth embodiment of the present invention, a flow control apparatus input switch 96 is provided on the input side. The routing of cells in the flow control apparatus input switch may by performed as follows.

The cells may by given an identifier indicating the flow control apparatus from which they are output. An identifier of the flow control apparatus is given beforehand to the flow control apparatus input switch 96 provided on the input side of the flow control apparatus. Cells are routed to the interior of the flow control apparatus if the aforesaid identifier attached to the cell, which is input from the cell input 130 or auxiliary cell input 98, corresponds; if it does not correspond, the cell is output to the auxiliary cell output 100 of the flow contol apparatus.

By attaching to a cell an identifier of the flow control apparatus from which this cell is to be output, the advantage is obtained that the need for the flow control apparatus to have a table that manages these items of information for each connection is eliminated.

An arrangement may by adopted wherein as a flow control apparatus identifier given beforehand to the flow control apparatus input switch, there is supplied a list of identifiers that are not identical with its own flow control apparatus identifier, and only cells having identifiers in that list are routed to the auxiliary cell output 100. This has the advantage that it eliminates the possibility of a cell having a wrong identifier attached to it being recycled indefinitely.

In the fifth embodiment of the flow control apparatus of the present invention equipped with an auxiliary cell input 98 and auxiliary cell output 100, a plurality of flow control apparatuses according to the present invention are connected mutually by means of auxiliary cell inputs and auxiliary cell outputs; it is thereby possible to have traffic that was input at the cell input of a particular flow control apparatus output at the cell output of another flow control apparatus specified by the identifier written in the cell.

The fifth embodiment of the present invention operates effectively in the case of a construction where, regarding input, the flows of a plurality of data cells are input in a form controlled by means of a single traffic parameter for guaranteeing transmission quality (e.g.,by limiting peak rate), or, regarding output, the flows of a plurality of data cells are output controlled by a single traffic parameter for guaranteeing transmission quality (e.g., by limiting the peak rate). This is because when considering various connection set ups, it is necessary for the flows of the plurality of connections that are controlled by a single traffic parameter to be output from the same flow control apparatus, so the flows of a plurality of connections that are input from a single input port of the switch can be output from cell outputs of different flow control apparatuses.

Figure 22:
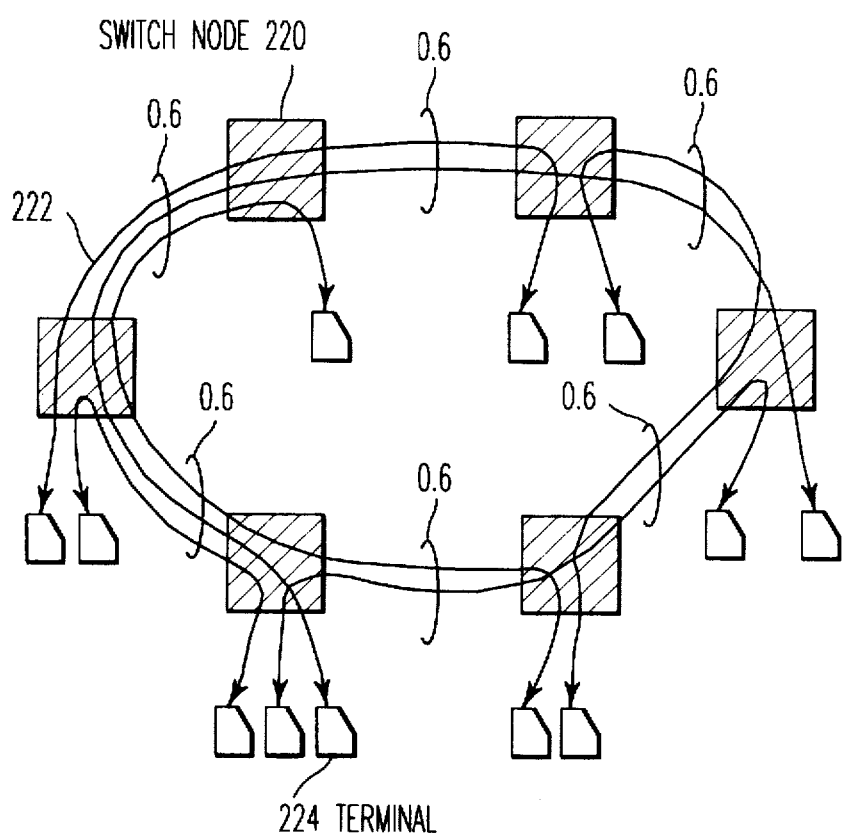
FIG. 22 shows an example of a network mode that can be constituted using a flow control apparatus according to the present invention and a switch node.

FIG. 22 shows an example of a network layout produced by combining a plurality of switch nodes to which flow control apparatus of the present invention are connected.

The switch nodes 220 are arranged in ring formation, and the traffic of the aggregated connections 222 subject to flow-control between the switch nodes is set to some value (in FIG. 22, peak rate of 0.6). The connections 222 connected between the terminals 224 utilize this bandwidth in common in each connection through the switch nodes 220. By constructing the network in this way, even when connection set up and release occurs frequently, it is unnecessary to alter the traffic parameters for guaranteeing transmission quality supplied to the flow control apparatus of the present invention (i.e.,the parameter that controls traffic between adjacent flow control apparatus of the present invention. In the case of FIG. 22, it is a peak rate of 0.6).

In the network layout, connecting the switch nodes on a ring was provided as example, however, the present invention can be effectively applied to other network topologies.

In the case where a flow control function is added to a switch node not having a flow control function that is already providing service, a flow control function can be implemented simply by connecting a flow control apparatus according to the present invention to the switch node.

Figure 23:
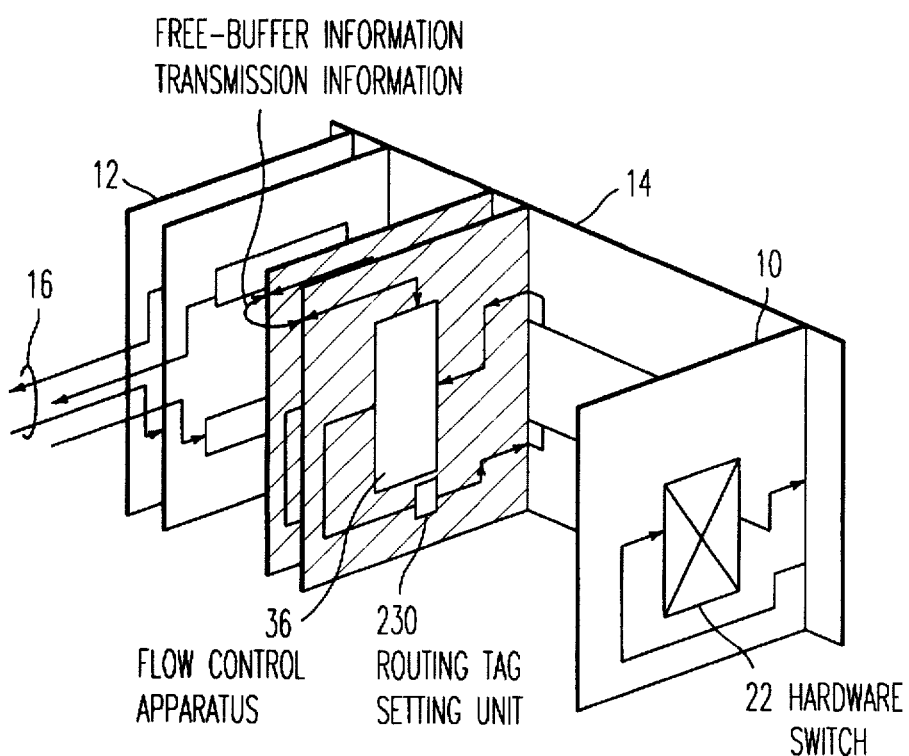
FIG. 23 shows the physical connection relationships between a flow control apparatus according to the present invention and a switch node.

FIG. 23 shows an example in which the second embodiment of the present invention is implemented using two slots of a back plane 14. The reason why a routing-tag setting unit 230 is arranged on the path to the hardware switch 22 from the cell output of the flow control apparatus 36 is so that cells that are output from the flow control apparatus 36 are routed to the target output port of the switch node. The first, third, fourth and fifth embodiments of the present invention can be implemented in the same way. The present invention can be connected to the back plane 14, and can be connected at the same slot where the interface circuit board can be connected. So long as the switch node has insertion capability, the function can be added while operation of the switch node is still maintained. Also, the stream of cells to the flow control apparatus of the present invention can be suppressed by a backpressure signal, through the back plane 14, when the cell buffer within the switch circuit board 10 is about to overflow. This has the advantage that the load on the switch circuit board 10 during congestion can be reduced.

Figure 24:
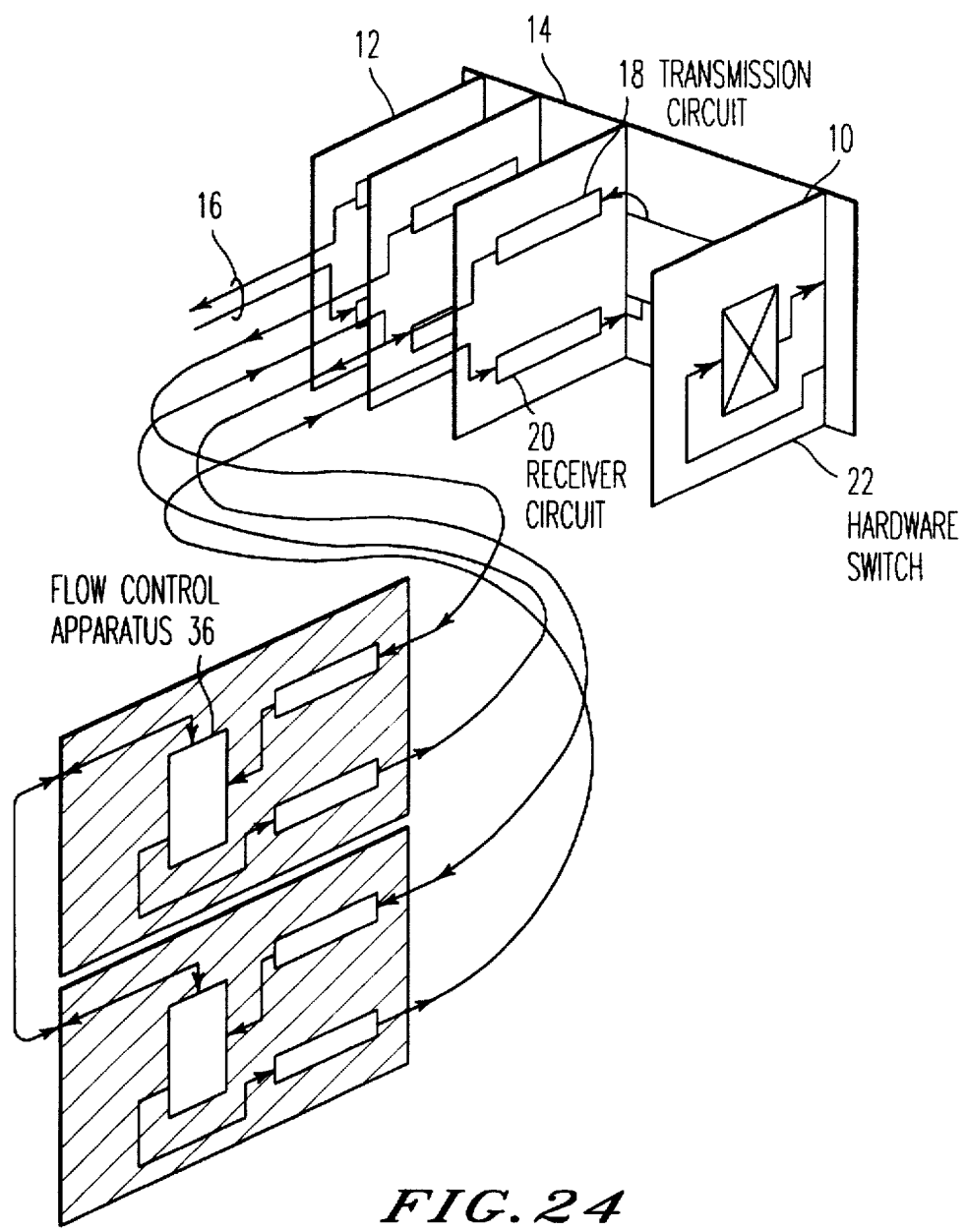
FIG. 24 shows the physical connection relationships between a flow control apparatus according to the present invention and a switch node.

As a further embodiment, a flow control apparatus according to the present invention can be implemented as an apparatus that can be connected to an interface point. FIG. 24 shows an example in which the second embodiment of the present invention is implemented using two interface points 16. The first, third, fourth and fifth embodiments of the present invention can also be implemented in the same way.

The following procedure may be adopted in allocating connection identifiers between switch nodes. When a plurality of connections are controlled by certain traffic parameters for guaranteeing transmission quality in order to eliminate cell loss at switch nodes that do not have flow control function, the advantage is obtained that routing can be achieved simply by reference to the VPI, and traffic can be monitored, at switch nodes not having a flow control function, by giving these connections the same VPI.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the inventions provided they are within the scope of the appended claims and their equivalents.

What is claimed is:

1. Flow control apparatus connected to an ATM switch without a flow control function, the ATM switch having a plurality of input ports and a plurality of output ports coupled among ATM exchanges through transmission links, an input port of said flow control apparatus is connected to one of the output ports of said ATM switch to receive ATM cells from said ATM switch and an output port of said flow control apparatus is connected to one of the input ports of said ATM switch to provide the ATM cells to said ATM switch, comprising:

buffer means for temporarily storing the ATM cells output from the one of the output ports of said ATM switch so that said ATM cells are provided to the one of the input ports of said ATM switch for transmission through said ATM switch to a next ATM exchange; and control means for providing a first control cell conveying free-buffer information of said buffer means to the one of the input ports of said ATM switch for transmission from one of the output puts connected through said ATM switch to a preceding ATM exchange, and for controlling provision of said ATM cells from said buffer means to said ATM switch based on second control cells received from said next ATM exchange and traffic parameters for guaranteeing quality such that the ATM cells are not lost in said ATM switch for transmission to said next ATM exchange, wherein the traffic parameters are preset.

2. Flow control apparatus according to claim 1,
including a plurality of said flow control apparatus for coupling to the ATM switch.

3. Flow control apparatus according to claim 2, wherein the plurality of flow control apparatus are coupled to the ATM switch to receive the ATM cells and the second control cells, and to provide to the ATM switch the ATM cells and the first control cells.

4. Flow control apparatus according to claim 2,
comprising two flow control apparatus coupled to the ATM switch, one of the two flow control apparatus for inputting the ATM cells and outputting the ATM cells based on the second control cell inputted to the other of the two flow control apparatus and the traffic parameters, and the other of the two flow control apparatus for outputting the first control cell conveying status of the buffer means of the one of the two flow control apparatus to control input of the ATM cells from the preceding ATM exchange.

5. Flow control apparatus according to claim 4, comprising plural pairs of the two flow control apparatus coupled to the ATM switch, one of each pair of the two flow control apparatus for inputting the ATM cells from the preceding ATM exchange through the ATM switch and for outputting the ATM cells to the next ATM exchange through the ATM switch, the other of each pair of the two flow control apparatus for inputting the second control cell from the next ATM exchange through the ATM switch to control output of the ATM cells by the one and for outputting the first control cell conveying status of the buffer means of the one to the preceding ATM exchange through the ATM switch to control input of the ATM cells to the one.

6. Flow control apparatus according to claim 5, wherein each flow control apparatus of the plural pairs respectively includes an auxiliary cell input port and an auxiliary cell output port, the auxiliary cell output port of one of each pair being coupled to the auxiliary cell input port of the one of a succeeding pair, the auxiliary cell output port of the other of each pair being connected to the auxiliary cell input port of the other of a preceding pair, the one of each pair for outputting the ATM cells through the auxiliary cell output port in response to one of the second control cells inputted through the auxiliary cell input port of the other of same pair, the other of each pair for outputting the first control cell conveying status of the buffer means of the one of the same pair through the auxiliary cell output port to control input of the ATM cells through the auxiliary cell input port of the one of the same pair.

7. Flow control apparatus according to claim 4, wherein said two flow control apparatus are coupled to each other through an interface, control information of the second control cell being transmitted from the other of the two flow control apparatus to the one of the two flow control elements through the interface, and status information of the buffer means of the one being transmitted from the one to the other through the interface.

8. Flow control apparatus according to claim 7,
further comprising first and second input switches respectively associated with the two flow control apparatus and each including a cell input port, an auxiliary cell input port and an auxiliary cell output port, the auxiliary cell input port of the first input switch being coupled to the auxiliary cell input port of the second input switch, each of the first and second input switches coupled to its associated flow control element for outputting the ATM cells to the buffer means of the flow control apparatus or to the auxiliary cell output port.

9. Flow control apparatus according to claim 3,
wherein said flow control apparatus includes a connection identification means for identifying connection of the inputted ATM cells, a plurality of buffers for storing the ATM cells in accordance with the connections, a free-buffer information generating means for generating the first control cells based on a status of the plurality of buffers, a free-buffer information extraction means for extracting free-buffer information from the second control cell, and an output scheduling means for outputting the ATM cells to the next ATM exchange through the ATM switch in accordance with the free-buffer information and the traffic parameters, and for outputting the first control cell to the preceding ATM exchange through the ATM switch.

10. Flow control apparatus according to claim 9, comprising two of the flow control apparatus, the output scheduling means of one of the flow control apparatus for outputting the ATM cells in accordance with the free-buffer information extracted by the free-buffer information extraction means of the other of the flow control elements and the traffic parameters, and the first control cell generated by the free-buffer information generating means of the one of the flow control apparatus being output through the output scheduling means of the other of the flow control apparatus.

11. Flow control apparatus according to claim 10, wherein each of the two flow control apparatus includes an auxiliary cell input port and an auxiliary cell output port, the output scheduling means of the one of the flow control apparatus outputs the ATM cells through the auxiliary cell output port in accordance with the free-buffer information input through the auxiliary cell input port of the other of the flow control apparatus and the traffic parameters, and the first control cell generated by the free-buffer information generating means of the one of the flow control apparatus is output through the auxiliary cell output port of the other of the flow control apparatus.

12. Flow control apparatus according to claim 9, comprising a plurality of the flow control apparatus coupled by interface means, the first free-buffer information cell generated by the free-buffer information generating means of one of the flow control apparatus being transmitted to other of the flow control apparatus through the interface means, and the second free-buffer information extracted by the free-buffer information extraction means of the other of the flow control apparatus being transferred to the output scheduling means of the one of the flow control apparatus through the interface means.

13. Flow control apparatus according to claim 12, wherein each of said flow control apparatus further includes an input switch having a cell input port, an auxiliary cell input port, an auxiliary cell output port and an identifier of the flow control element, the identifier representing a plurality of connections whose flow of the ATM cells is controlled by the traffic parameters preset in the flow control element, the input switch including means for supplying the ATM cells input from the cell input port or the auxiliary cell input port to the flow control apparatus if an identifier of the ATM cells is the same as an identifier of the flow control apparatus, and for outputting the ATM cells through the auxiliary cell output port if the identifier of the ATM cells is not the same as the identifier of the flow control apparatus.

14. A method for performing flow control of an ATM switch without a flow control function, the ATM switch having a plurality of input ports and a plurality of output ports coupled among ATM exchanges through transmission links, and a buffer coupled to one of the output ports of said ATM switch and coupled to one of the input ports of said ATM switch, comprising the steps of:

storing temporarily in said buffer, ATM cells output from the one of the output ports of said ATM switch so that the ATM cells are provided to the one of the input ports of said ATM switch for transmission through said ATM switch to a next ATM exchange;

providing a first control cell conveying free-buffer information of said buffer to the one of the input ports of said ATM switch for transmissions through said ATM switch to a preceding ATM exchange; and controlling provision of the ATM cells from said buffer to said ATM switch based on second control cells received from said next ATM exchange and traffic parameters for guaranteeing quality such that the ATM cells are not lost in said ATM switch for transmission to said next ATM exchange, wherein the traffic parameters are preset.

15. A memory for storing computer-executable program code for performing flow control of an ATM switch without a flow control function, the ATM switch having a plurality of input ports and a plurality output ports coupled among ATM exchanges through transmission links, and a buffer coupled to one of the output ports of said ATM switch and coupled to one of the input ports of said ATM switch, comprising:

means for causing a computer to temporarily store in said buffer, ATM cells output from the one of the output ports of said ATM switch so that the ATM cells are provided to the one of the import ports of said ATM switch for transmission through said ATM switch to a next ATM exchange;

means for causing a computer to provide a first control cell conveying free-buffer information of said buffer to the one of the input ports of said ATM switch for transmission through said ATM switch to a preceding ATM exchange; and means for causing a computer to control provision of the ATM cells from said buffer to said ATM switch based on second control cells received from said next ATM exchange and traffic parameters for guaranteeing quality such that the ATM cells are not lost in said ATM switch for transmission to said next ATM exchange, wherein the traffic parameters are preset.

* * * * *